United States Patent
Goldish et al.

(10) Patent No.: US 9,101,520 B2
(45) Date of Patent: Aug. 11, 2015

(54) MOBILE MANUAL STANDING WHEELCHAIR

(71) Applicant: The United States of America, as Represented by the Department of Veterans Affairs, Washington, DC (US)

(72) Inventors: Gary D. Goldish, Plymouth, MN (US); Andrew Hansen, Apple Valley, MN (US); Eric A. Nickel, Brooklyn Park, MN (US)

(73) Assignees: The United States of America, as Represented by the Department of Veterans Affair, Washington, DC (US); The Regents of the University of Minnesota, St. Paul, MN (US)

( * ) Notice: Subject to any disclaimer, the term of this patent is extended or adjusted under 35 U.S.C. 154(b) by 0 days.

(21) Appl. No.: 14/552,235

(22) Filed: Nov. 24, 2014

(65) Prior Publication Data

US 2015/0084307 A1 Mar. 26, 2015

Related U.S. Application Data

(63) Continuation-in-part of application No. 13/644,139, filed on Oct. 3, 2012.

(60) Provisional application No. 61/555,620, filed on Nov. 4, 2011.

(51) Int. Cl.
| | |
|---|---|
| *B62M 1/14* | (2006.01) |
| *A61G 5/10* | (2006.01) |
| *B62M 1/36* | (2013.01) |
| *A61G 5/08* | (2006.01) |
| *A61G 5/14* | (2006.01) |
| *A61G 5/02* | (2006.01) |
| *A61G 5/12* | (2006.01) |

(52) U.S. Cl.
CPC .. *A61G 5/10* (2013.01); *A61G 5/08* (2013.01); *A61G 5/14* (2013.01); *B62M 1/14* (2013.01); *B62M 1/36* (2013.01); *A61G 5/026* (2013.01); *A61G 2005/1051* (2013.01); *A61G 2005/128* (2013.01); *A61G 2200/56* (2013.01)

(58) Field of Classification Search
CPC ... A61G 5/10; A61G 5/08; A61G 2005/1089; A61G 7/1046; A61G 1/0268; A61G 1/017; B62M 1/14; B62M 1/36
See application file for complete search history.

(56) References Cited

U.S. PATENT DOCUMENTS

| | | | | | |
|---|---|---|---|---|---|
| 287,789 | A | * | 11/1883 | Arbogast | 280/211 |
| 698,101 | A | * | 4/1902 | Broadbelt | 280/650 |
| 2,181,420 | A | * | 11/1939 | Everest et al. | 280/250 |
| 2,847,058 | A | * | 8/1958 | Lee | 297/44 |
| 4,380,343 | A | * | 4/1983 | Lovell et al. | 280/250.1 |
| 4,598,944 | A | * | 7/1986 | Meyer et al. | 297/183.9 |

(Continued)

*Primary Examiner* — Joseph Rocca
*Assistant Examiner* — Conan Duda
(74) *Attorney, Agent, or Firm* — Gorman Law Offices; Robert Gorman

(57) ABSTRACT

The present invention relates to a novel approach to improving the use of wheelchairs by offering the ability for the wheelchair to transition between accommodation for a seated position, and accommodation for a standing position, more particularly, wherein the inventive mobile manual standing wheelchair allows for a standing position during the course of mobile use, and which also permits the user to traverse narrow entrances and doorframes, and also allows the user to have improved access in front for elevated surfaces such as countertops and the like.

10 Claims, 27 Drawing Sheets

(56) References Cited

U.S. PATENT DOCUMENTS

| | | | | |
|---|---|---|---|---|
| 4,625,984 A * | 12/1986 | Kitrell | | 280/250.1 |
| 4,685,693 A * | 8/1987 | Vadjunec | | 280/250.1 |
| 4,758,013 A * | 7/1988 | Agrillo | | 280/250.1 |
| 4,759,418 A * | 7/1988 | Goldenfeld et al. | | 180/65.1 |
| 4,766,772 A * | 8/1988 | Tsuchie | | 74/126 |
| 4,807,897 A * | 2/1989 | Schultz | | 280/250 |
| 5,037,120 A * | 8/1991 | Parisi | | 280/250.1 |
| 5,096,008 A * | 3/1992 | Mankowski | | 180/6.5 |
| 5,211,414 A * | 5/1993 | Galumbeck | | 280/250.1 |
| 5,346,280 A * | 9/1994 | Deumite | | 297/330 |
| 5,356,172 A * | 10/1994 | Levy et al. | | 280/650 |
| 5,366,036 A * | 11/1994 | Perry | | 180/65.1 |
| 5,401,044 A * | 3/1995 | Galumbeck | | 280/250.1 |
| 6,073,951 A * | 6/2000 | Jindra et al. | | 280/304.1 |
| 6,533,304 B2 * | 3/2003 | Lizama-Troncoso et al. | | 280/250.1 |
| 6,619,681 B2 * | 9/2003 | Gutierrez | | 280/250.1 |
| 6,851,751 B1 * | 2/2005 | Romero et al. | | 297/331 |
| 6,976,698 B2 * | 12/2005 | Kuiken | | 280/647 |
| 7,077,416 B2 * | 7/2006 | Duarte | | 280/304.1 |
| 7,165,778 B2 * | 1/2007 | Kuiken | | 280/250.1 |
| 7,708,093 B1 * | 5/2010 | Baker | | 180/65.1 |
| 7,784,815 B2 * | 8/2010 | Porcheron | | 280/647 |
| 7,815,209 B2 * | 10/2010 | Porcheron | | 280/304.1 |
| 7,845,665 B2 * | 12/2010 | Borisoff | | 280/250.1 |
| 7,900,945 B1 * | 3/2011 | Rackley | | 280/244 |
| 7,921,953 B2 * | 4/2011 | Irvine | | 180/208 |
| 8,403,352 B2 * | 3/2013 | Hunziker | | 280/304.1 |
| 2004/0188152 A1 * | 9/2004 | Schaffner | | 180/65.1 |
| 2004/0222603 A1 * | 11/2004 | Pichette | | 280/33.991 |
| 2004/0262859 A1 * | 12/2004 | Turturiello et al. | | 280/5.515 |
| 2005/0151360 A1 * | 7/2005 | Bertrand et al. | | 280/755 |
| 2006/0091663 A1 * | 5/2006 | Jackson et al. | | 280/755 |
| 2006/0097478 A1 * | 5/2006 | Goertzen et al. | | 280/304.1 |
| 2007/0296177 A1 * | 12/2007 | Porcheron | | 280/250.1 |
| 2008/0111338 A1 * | 5/2008 | Ilan | | 280/250.1 |
| 2009/0174168 A1 * | 7/2009 | Pavlopoulos et al. | | 280/250.1 |
| 2009/0309327 A1 * | 12/2009 | Huang | | 280/304.1 |
| 2010/0101882 A1 * | 4/2010 | Thompson | | 180/89.1 |
| 2010/0207353 A1 * | 8/2010 | Hsu | | 280/304.1 |
| 2011/0215540 A1 * | 9/2011 | Hunziker et al. | | 280/5.2 |
| 2011/0215547 A1 * | 9/2011 | Davenport | | 280/250.1 |
| 2013/0175103 A1 * | 7/2013 | Flowers | | 180/65.1 |

* cited by examiner

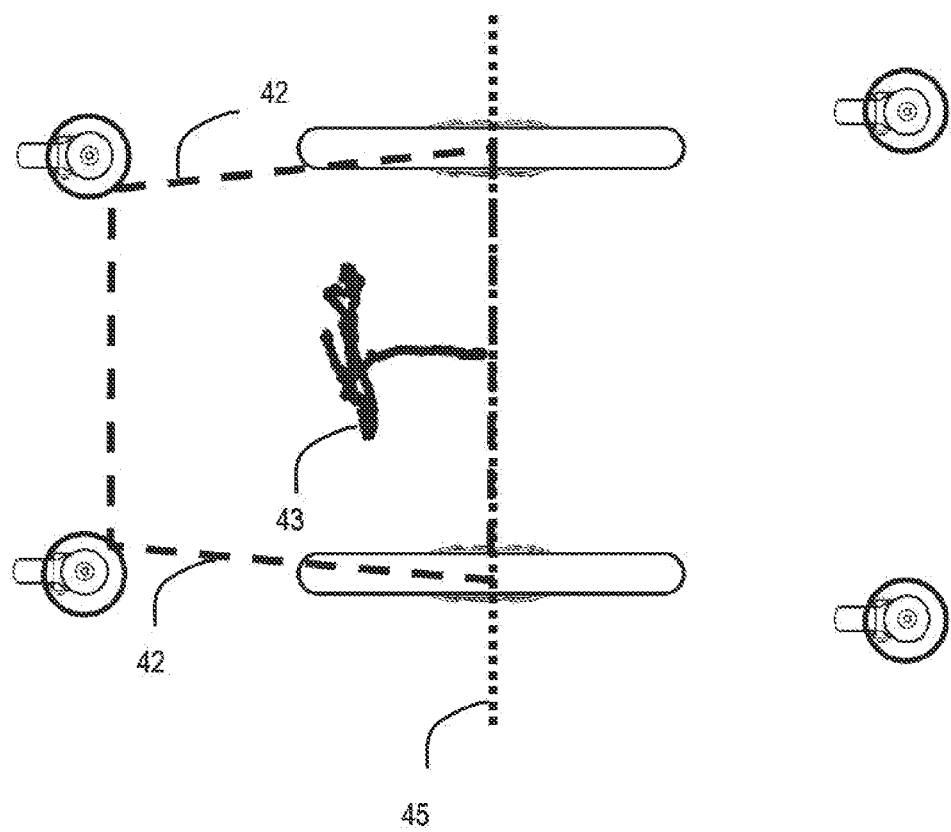

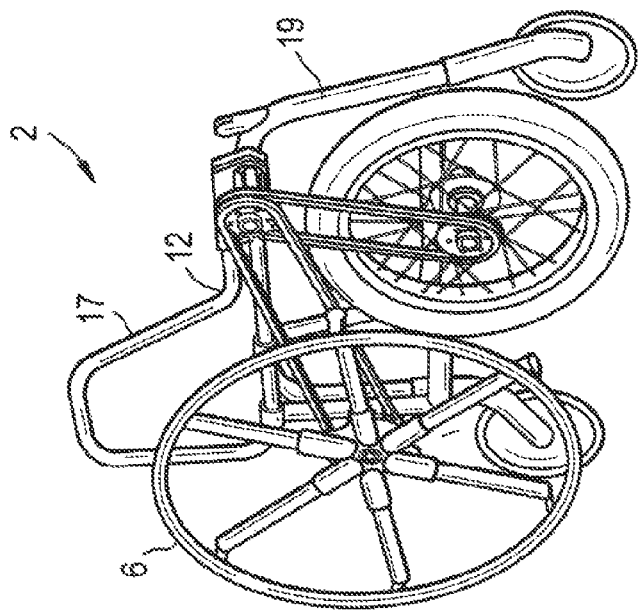
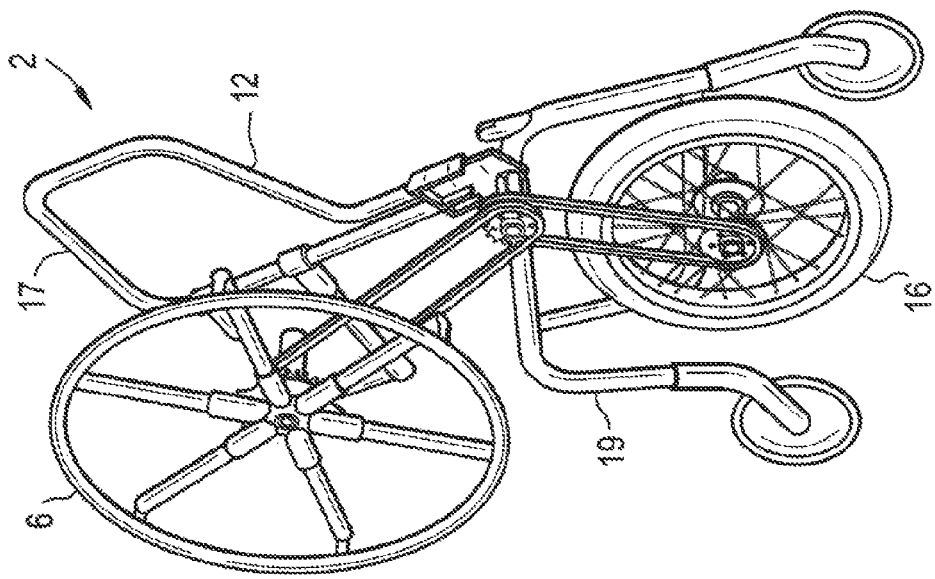

MOBILE MANUAL STANDING WHEELCHAIR

CROSS-REFERENCE TO RELATED APPLICATIONS

This application is a continuation-in-part of U.S. application Ser. No. 13/644,139, filed 3 Oct. 2012, which claims priority from U.S. Provisional Application No. 61/555,620, filed 4 Nov. 2011, and claims benefit of each of the aforementioned respective filings, both of which are hereby incorporated by reference in their entirety.

FIELD OF THE INVENTION

The present invention relates to a novel approach to improving the use of wheelchairs, by offering the ability for the wheelchair to transition between accommodation for a seated position, and accommodation for a standing position, wherein the manual standing wheelchair allows for a standing position while moving. The present invention further provides for an improved center of gravity across the seated position and the standing position, especially as it pertains to improved traction during movement effectuation, and additionally, offers unprecedented access to counters or other elevated surfaces that may confront users, through novel provision of a space adjustment offset that allows a standing user to rotate obstructing structure of the wheelchair out of the way, thereby increasing the anterior clearance space in front of wheelchair. Similarly, independent rotation of obstructing structure when seated allows improved clearance for lateral transfers, as well as for opening up lateral space for user arms and/or hands to move while a user is standing or working at a counter or bench. Moreover, the present invention also provides for innovative placement of an auto-tensioned drive system on the wheelchair frame, such that the present wheelchair, can traverse thresholds or older, more narrow door frames, and also provides for front wheels that can descend or retract in order to improve ground clearance during a seated movement operation. In achieving the above, the innovative wheelchair provides for preserving or improving a narrow width or profile as compared with known wheelchairs, yet provides for the unique drive links that offer standing and seated movement.

BACKGROUND OF THE INVENTION

Different types of standing wheelchairs are known in the art and often take the form of simple systems that elevate a user from a seated position to a semi-standing position when the wheel chair is stopped. It is, however, unknown in the art to provide a manual standing wheelchair that permits a user to enjoy the freedom of standing while moving the wheelchair. It is a further problem in the art to provide a wheelchair that is not only stable when moving while a user is in a standing position, but also to provide a wheelchair that, in one embodiment, offers the benefits of manual (rather than electric) propulsion, such as increased cardiovascular and muscular benefits, and independence from batteries and power sources. It is a further problem to provide such a manual propulsion system that maintains a relatively constant arm position for users as they propel the wheelchair along by grasping and pushing the rims of the side wheels of a wheel chair. It is yet another problem in the prior art to provide a standing wheelchair that provides a light weight, variable speed solution that can offer both seated and standing movement in the forward, reverse, and turning directions. It is an additional problem that known wheelchairs cannot provide retractable front wheels that can retract for ground clearance when in seated operation, nor can known wheelchairs allow for narrowly inset wheels with auto-tensioned drive systems that permit users to traverse narrow doorways.

SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides a novel approach to improving the use of manual standing wheelchairs, including offering the ability for the manual standing wheelchair to transition between accommodation for a seated position, and an improved accommodation for a standing position. To this end, the inventive mobile manual standing wheelchair therefore allows for a standing position during the course of mobile use, without impairing access through narrow passage ways, and improved access to elevated surfaces such as counters. Provision of such offers a way to decrease pressure sores on sitting surface tissues of a user, increase subjective bladder and bowel function, decrease osteoporosis of lower limb bones, decrease urinary tract infections, decrease spasticity, increase range of motion, and increase independence and quality of life. In addition, the inventive mobile manual standing wheelchair offers features which also make it advantageous for patients in that, unlike conventional standing wheelchairs, it is manual, rather than electric, and can offer the cardiovascular and muscle benefits of manual propulsion (e.g., free of batteries or other electric propulsion), while providing the user independence from batteries and power sources. In both the seated and standing positions, the inventive mobile manual standing wheelchair is therefore structured so as to permit usage of the user's hands along the rims of a set of large user propulsion wheels on either side of the center structure, in such a way that the set of large user propulsion wheels remains, in either the seated or standing position, approximately the same distance from and within the same alignment as the users shoulders so that the positioning of the arms need not be altered much. Additionally, these user propulsion wheels can be positioned out of the way when a user requires additional anterior clearance space, opening up space in the front of the wheelchair while standing or laterally while sitting. Furthermore the drive wheels are inset so as to reduce the width profile enough to clear narrow doorframes and the like.

Thus, in affording the above, the present invention provides for the following beneficial advances relating to: (1) Maintaining optimal access through narrow passage ways through cooperatively mating user propulsion wheels with drive wheels that are inset so as to reduce the width profile of the wheelchair; (2) Provision of improved anterior access space of the wheelchair when positioned in front of elevated surfaces such as counters, through use of rotating members that facilitate positioning of user propulsion wheels out of the way when needed; (3) Provision of an improved standing configuration that permits a user to be more fully standing upright as measured against a true vertical plane, yet preserves traction of drive wheels for mobility purposes (4) Provision of a novel auto-tensioning linkage system maintains the general length of the link(s) therein, thereby offering user propulsion wheels that retain a constant distance to user arms and similar orientation to the trunk of the user (e.g., both user propulsion wheels are connected to a rotating member that is movable proximate to the chassis of the wheelchair, so as to maintain their general positioning with respect to the users' shoulders); (5) Provision of retractable frontal wheels for improved ground clearance capabilities during seated operation; (6) Provision of a second propulsion wheel of smaller or larger diameter mounted centrally on the same axis as the first propulsion wheel, allowing the user to manually change gear ratios without the need to manipulate levers or shifters by simply pushing propulsion wheels of different diameters; (7) Provision of a drive system that allows for (i) standard wheelchair gearing (ii) slower gearing that is available for ascending inclined surface areas or for patients with reduced arm strength, and (iii) faster gearing that is available to allow faster propulsion in the seated position. To this end, the present invention overcomes the aforementioned and other disadvantages inherent in the prior art. Other objects and advantages of the present invention will be more readily apparent from the following detailed description when read in conjunction with the accompanying drawings.

BRIEF DESCRIPTION OF THE DRAWINGS

FIGS. 4A-4B are top down views of the center of gravity of the standing wheelchair for both seated (FIG. 4A) and standing (FIG. 4B) during forward and side-to-side leaning by user according to the present invention;

FIG. 9 depicts offset side frontal views of one embodiment of the standing wheelchair with one version of an illustrative "two belt" system having: the rear stabilizing wheel, the front (directional support) wheel, double chain linkage, rotating member, and cooperatively mating drive wheel (with cooperating user propulsion wheel depicted therewith), across various positions, from fully retracted or seated position (with frontal wheels fully retracted, and rotating member in a fully retracted position), to fully extended or standing position (with frontal wheels fully extended, and rotating member in a fully upward position), according to one embodiment of the present invention;

DETAILED DESCRIPTION OF THE INVENTION

Figure 1A:
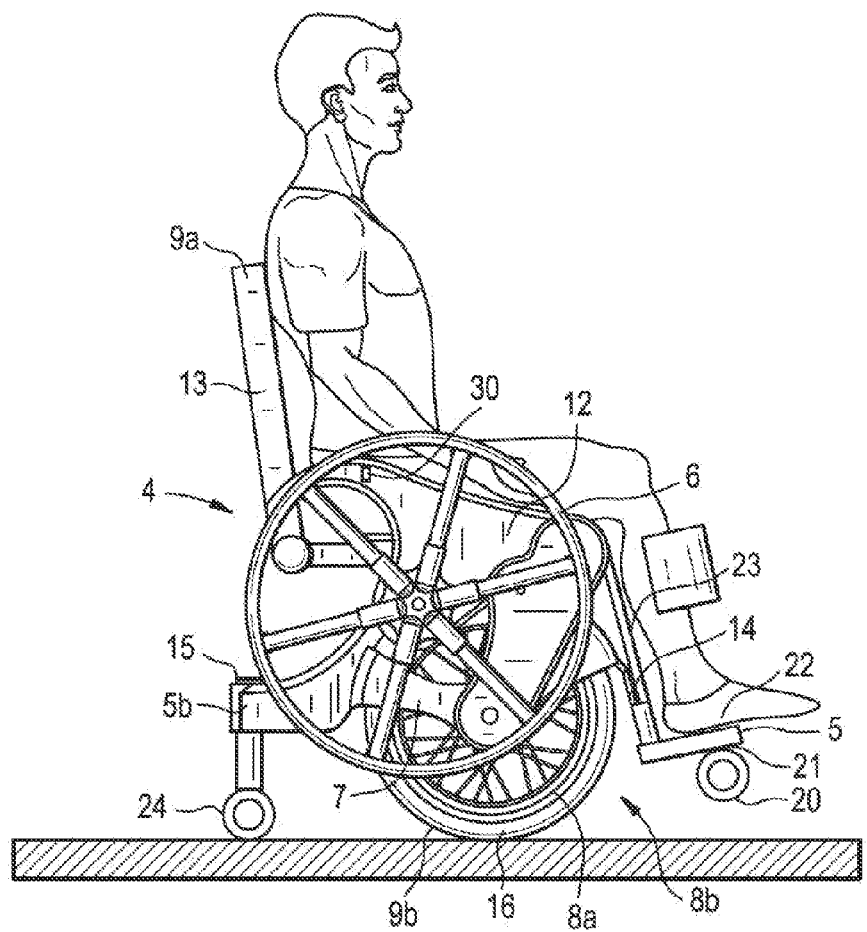
FIGS. 1A-1F are side views, showing only one-half or one side of the multiplicity of wheels, rotating member, and associated support structure of one embodiment of the standing wheelchair when retracted in the (fully) seated position with a user illustratively seated thereon, an intermediate position transitioning to from seated position, and a standing position according to one variant of the present invention (FIGS. 1A, 1C, and 1E) and further illustrations depicting the rotating member positioned (elevated or fully extended) independently of said transitions (FIGS. 1B, 1D and 1F)
Figure 1B:
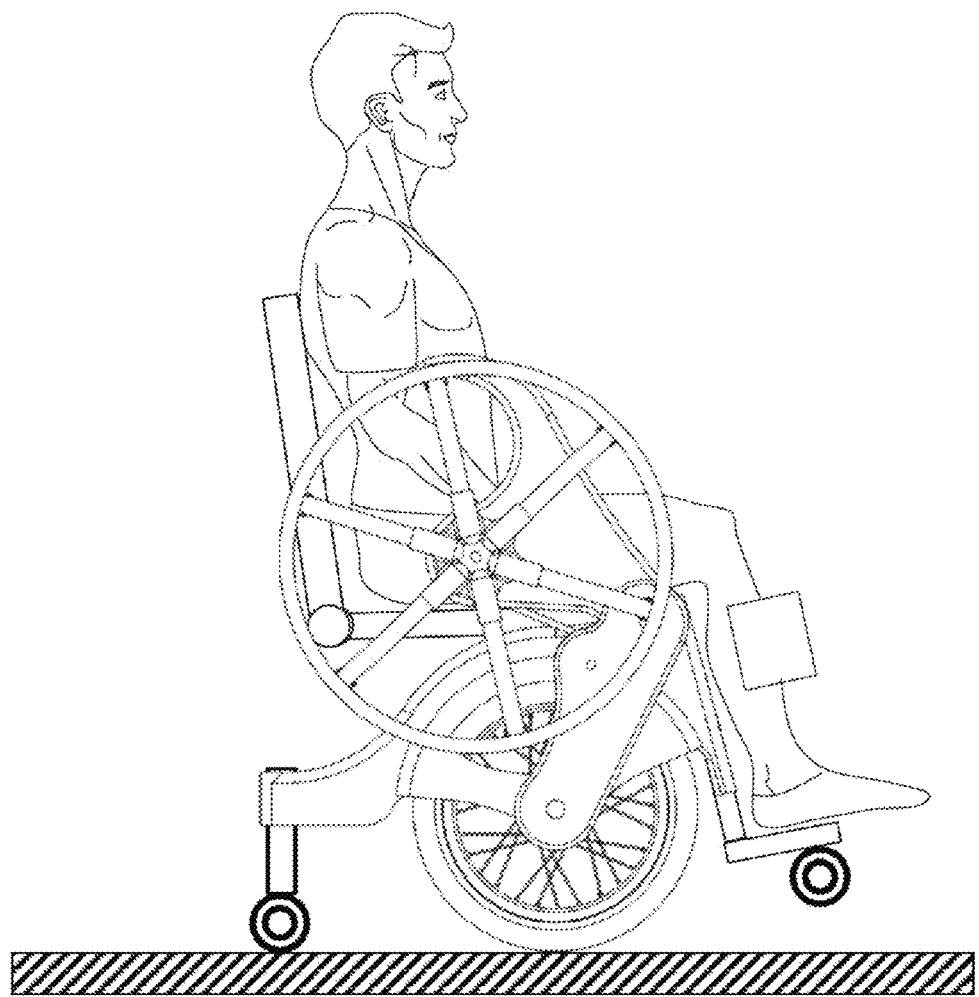
Figure 1C:
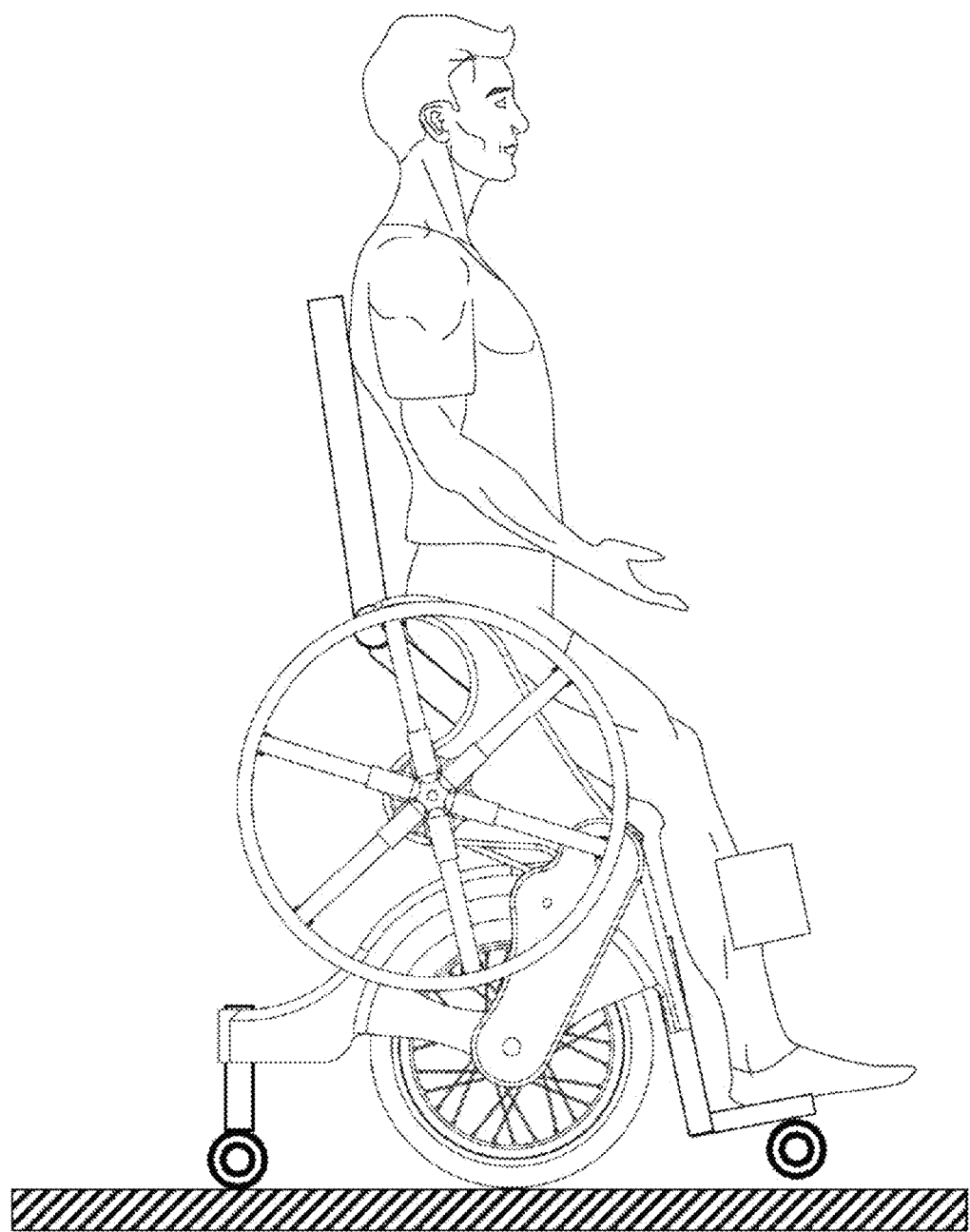
Figure 1D:
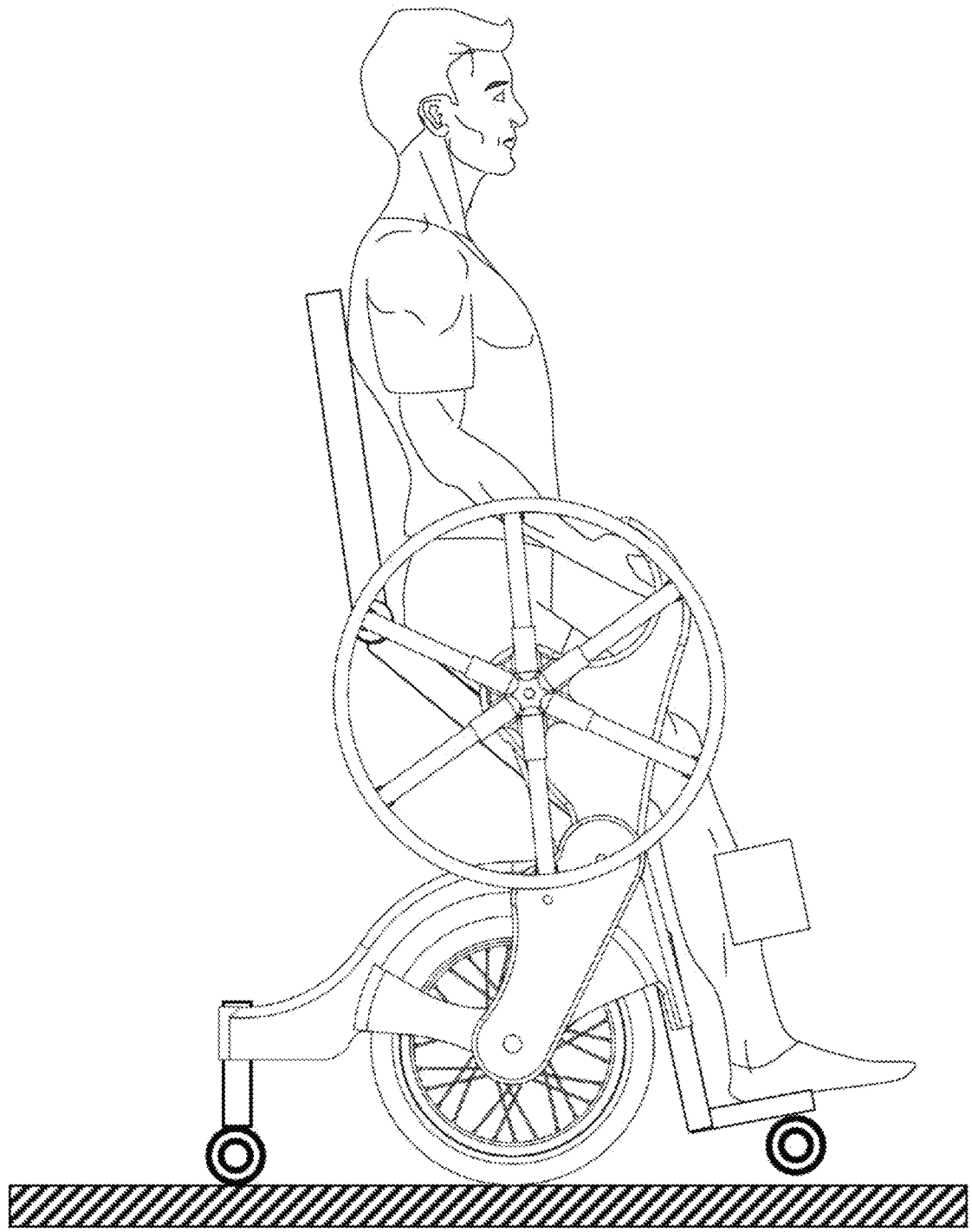
Figure 1E:
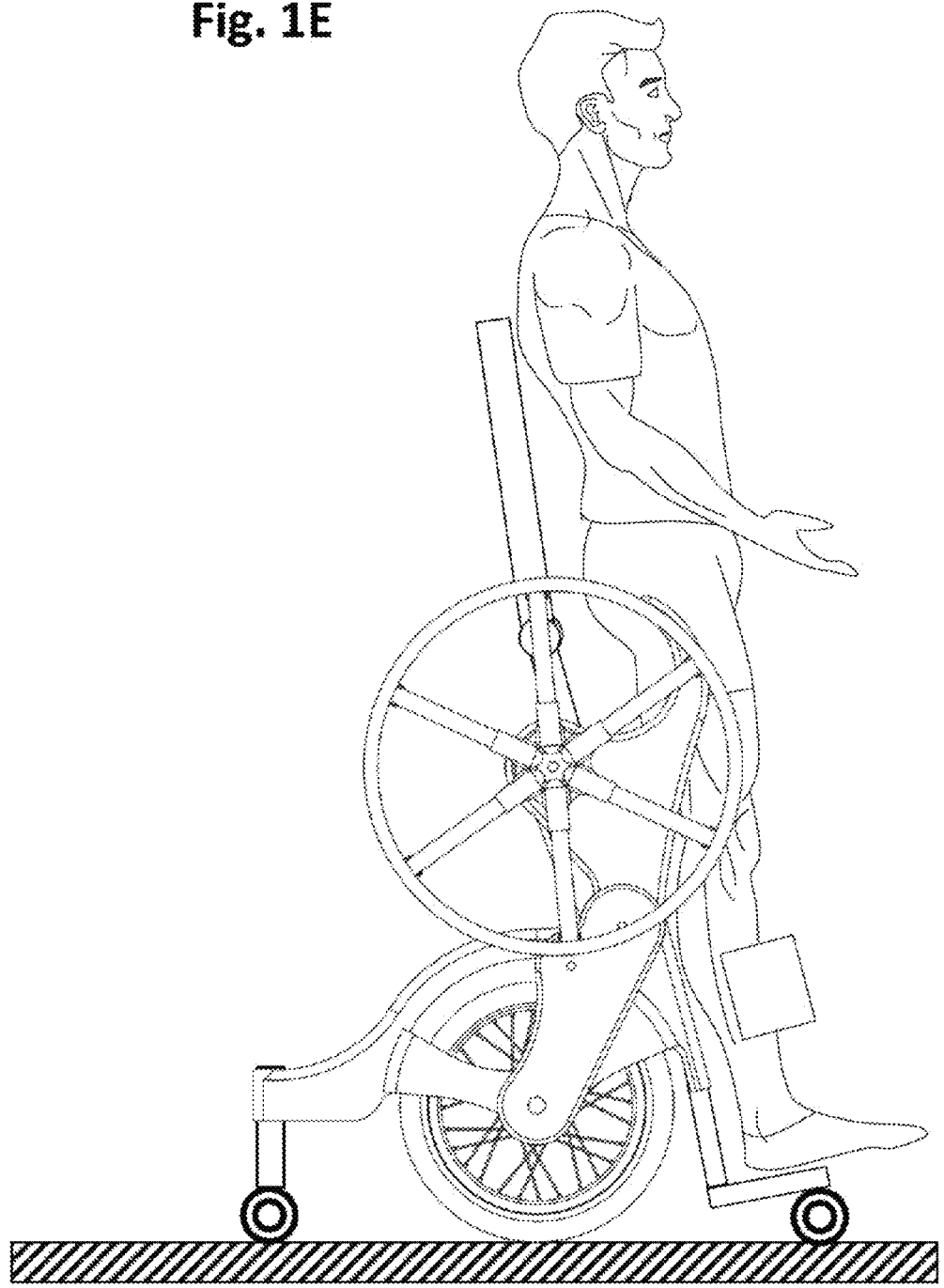
Figure 1F:
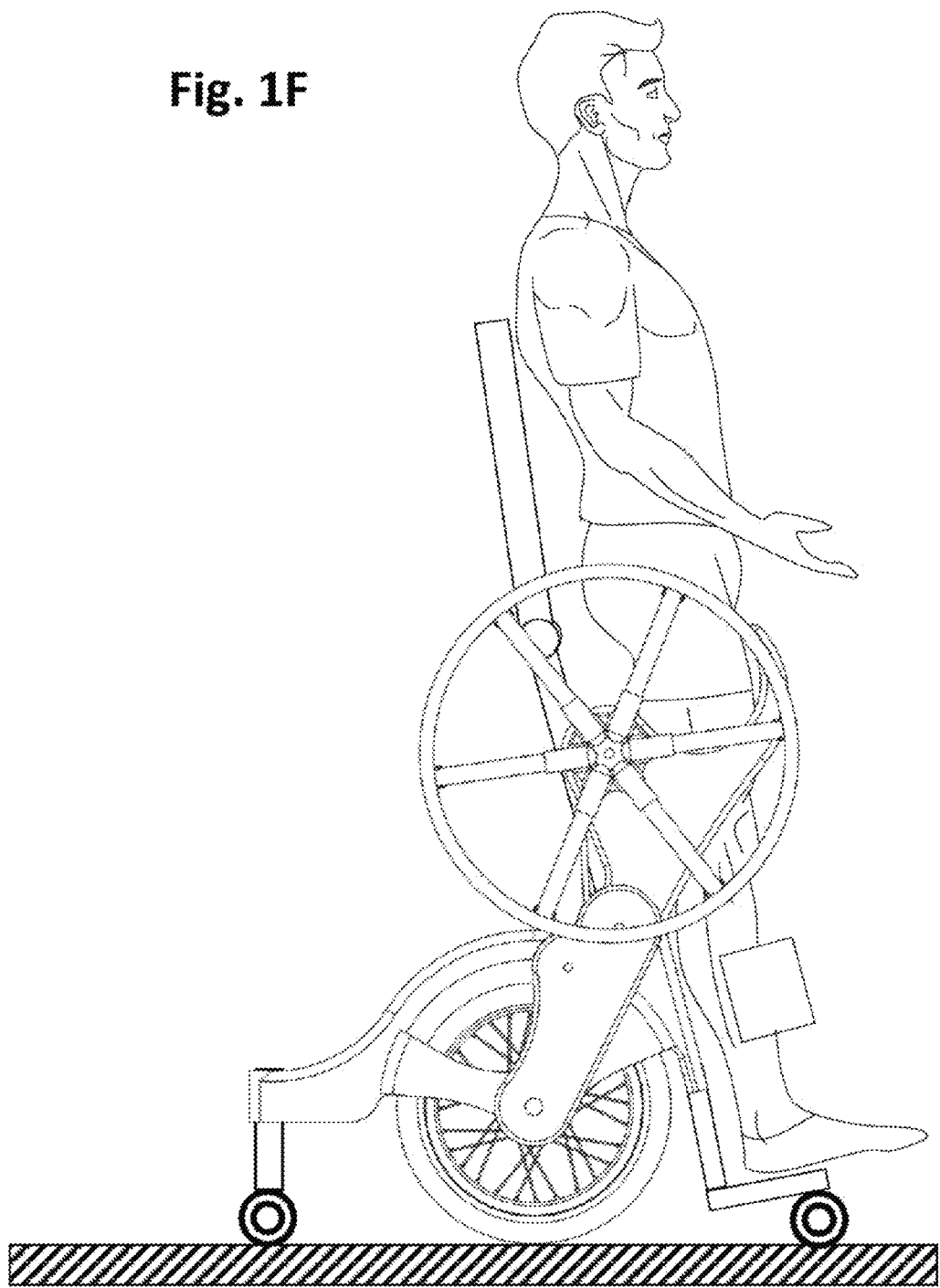
Figure 2A:
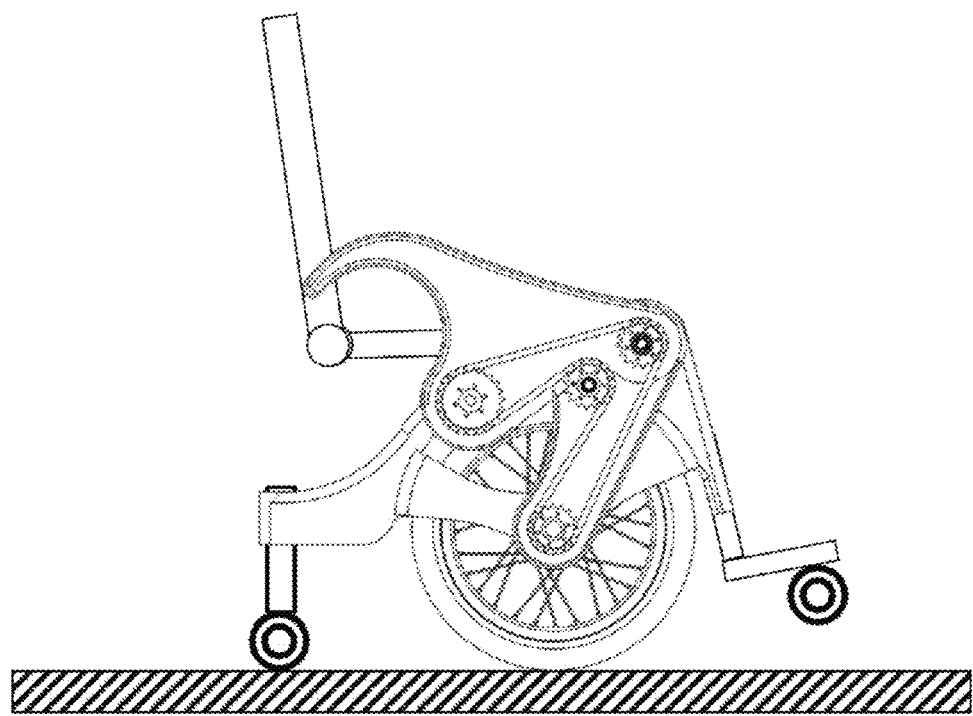
FIGS. 2A-2D are side views showing only one-half or one side of the multiplicity of wheels and associated support structure of one embodiment of the standing wheelchair when retracted in the (fully) seated position, an intermediate position transitioning to/from seated position, and a standing position according to one variant of the present invention, and a further illustration depicting the rotating member positioned (elevated or fully extended) independently of said transitions (FIGS. 2D)
Figure 2B:
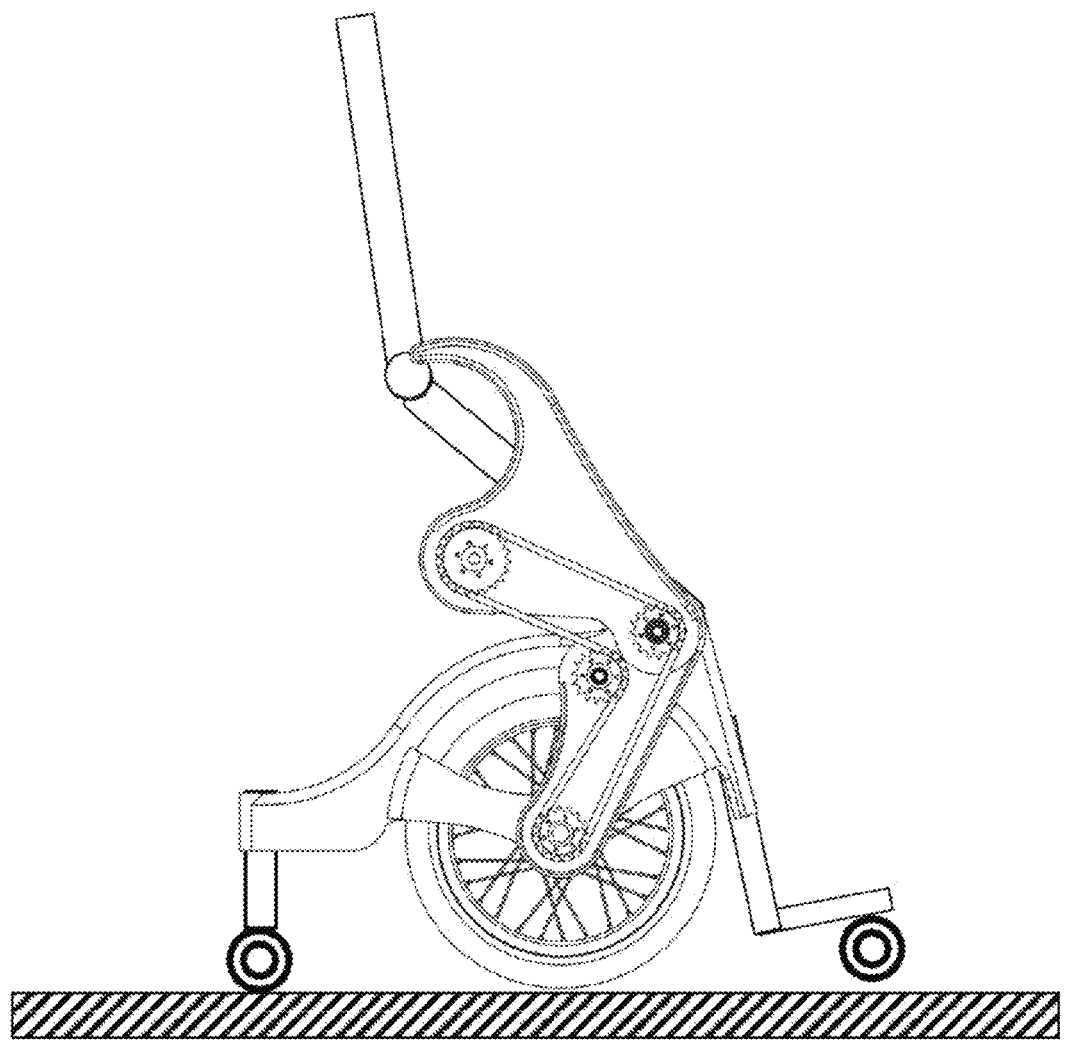
Figure 2C:
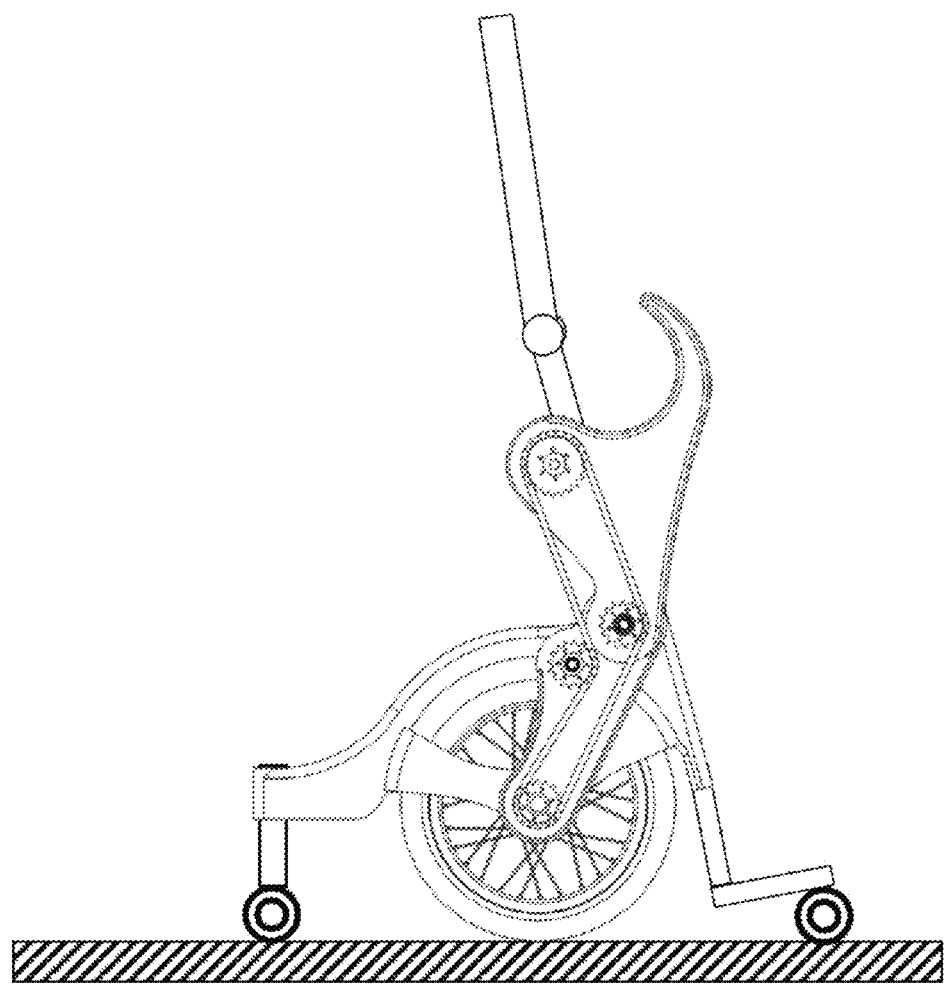
Figure 2D:
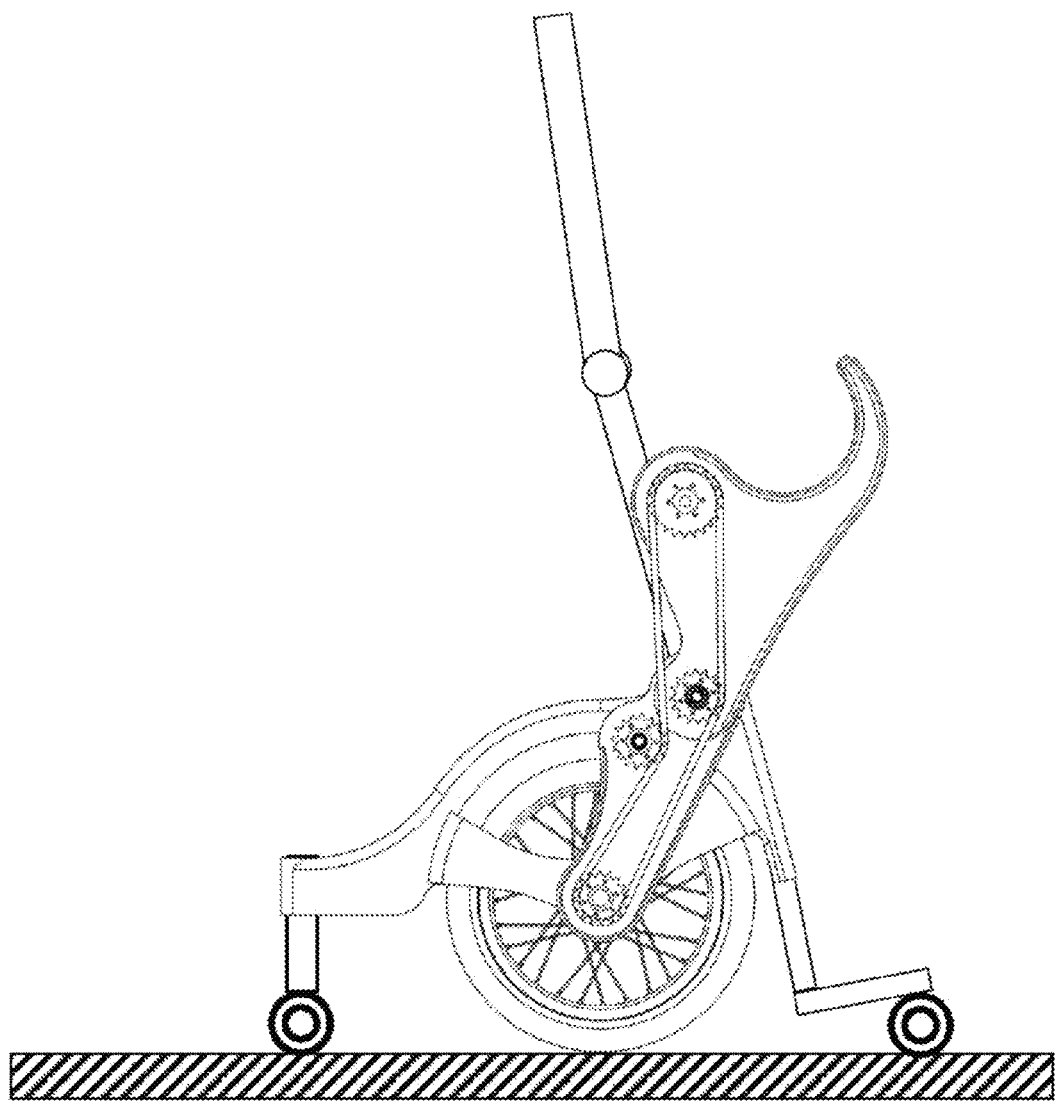
Figure 3A:
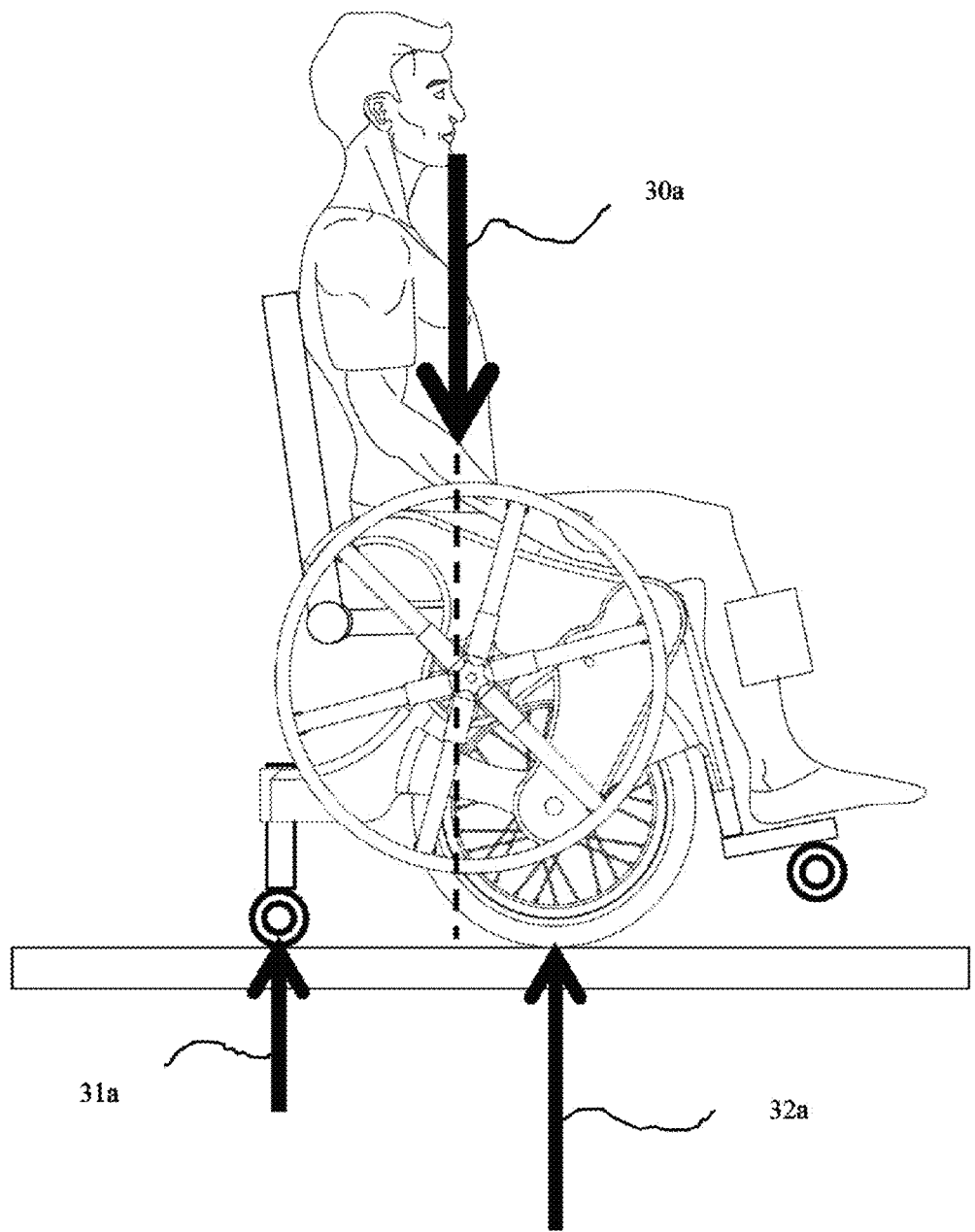
FIGS. 3A-3C are side views showing only one-half or one side of the multiplicity of wheels and associated support structure of one embodiment of the standing wheelchair when retracted in the (fully) seated position, with a user illustratively seated thereon, an intermediate position transitioning to/from seated position, and a standing position according to one variant of the present invention, each of which include lines indicating the vectors of the locus of force or centers weight of each respective position.
Figure 3B:
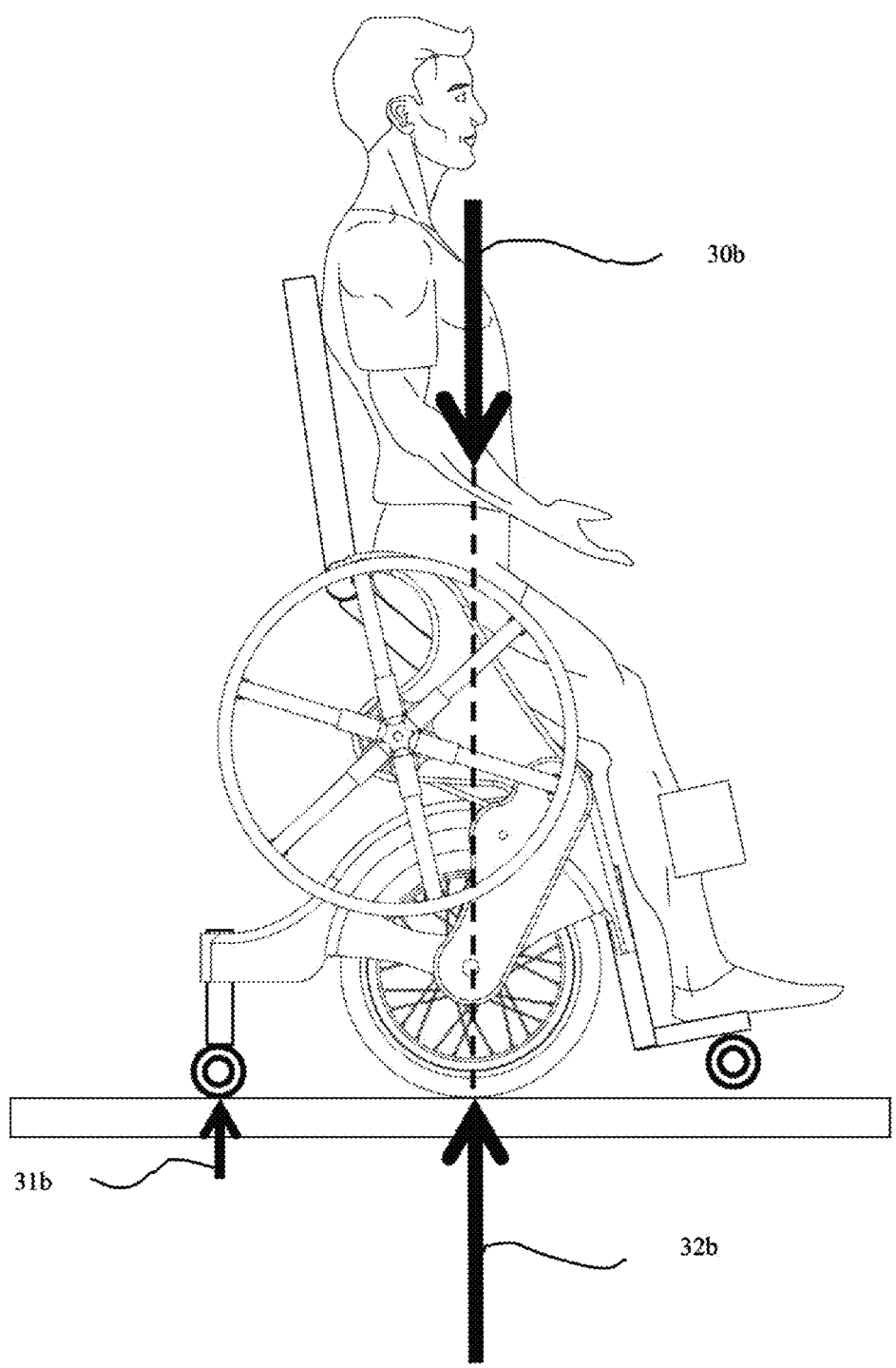
Figure 3C:
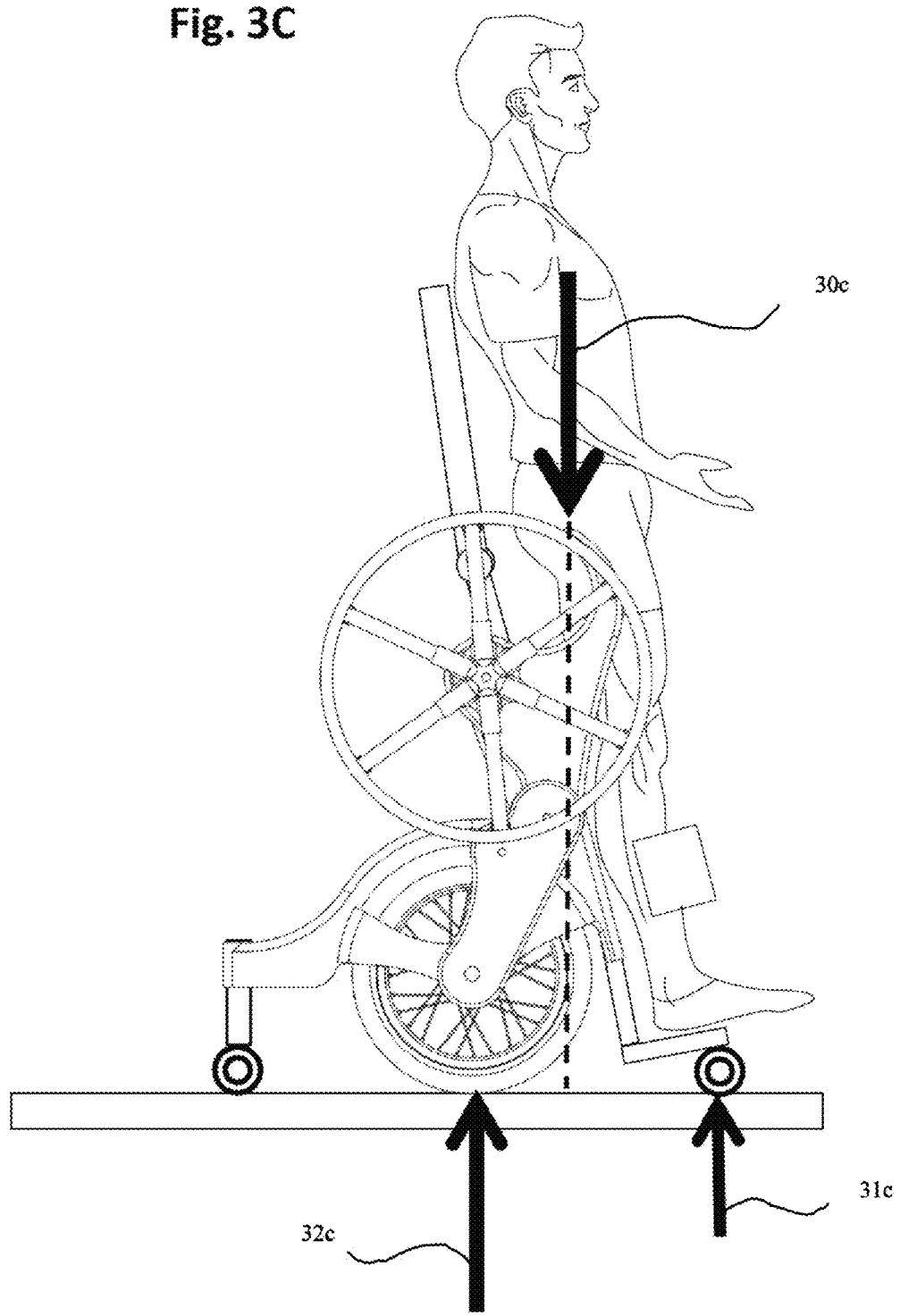

At its broadest level, and as depicted in FIGS. 1-6, and 8-10, the present invention is directed to a standing wheelchair 2 that comprises: a chassis 4 having a front portion 5, a rear portion 15, a center portion 7, a left portion 8b, a right portion 8a, a top portion 9a, and a bottom portion 9b; at least two ground drive wheels 16, one of the two ground drive wheels being rotatably affixed on the left portion 8b of chassis 4, and the other of the two ground drive wheels being rotatably affixed to the right portion 8a of chassis 4; a rotating structure 12, comprising a left rotating structure and a right rotating structure, wherein each of left rotating structure and right rotating structure is attached, respectively, to left portion 8b and right portion 8a of chassis 4; an adjustment actuator 30 for raising and lowering at least a portion of chassis 4 between a seated position and a standing position and any intermediate positions therebetween; at least two user propulsion wheels 6, each laterally outset relative to chassis 4 and affixed proximate to rotating structure 12 (e.g., as seen in profile depiction in FIG. 8), one of at least two user propulsion wheels being rotatably affixed to left rotating structure, and one of at least two user propulsion wheels being rotatably affixed to right rotating structure; an auto tensioning linkage system 50 connecting one of at least two user propulsion wheels 6 with one of said two ground drive wheels 16 at left portion 8b of chassis 4, and one of two ground drive wheels 16 at right portion 8a of said chassis, each of both ground drive wheels are medially inset relative to chassis 4 (e.g., as seen in profile depiction in FIG. 8); directional support wheels 20 movably affixed at front portion 5 of chassis 4, wherein directional support wheels 20 include a caster structure 21 for affixment of directional support wheels 20 to a foot rest 22 affixed to front portion 5 of chassis 4, and a frontal extension 23 for retraction of foot rest 22 and directional support wheels 20 off the ground during seated operation, and for descent during standing operation; a set of stabilizing rear wheels 24 situated structurally opposite said directional support wheels at rear portion 5b of chassis 4; and wherein each at least two ground drive wheels 16 are rotatably affixed at center portion 7 of respectively left portion 8b and said right portion 8a, of said chassis 4, between directional support wheels 20 and stabilizing rear wheels 24, as a means for maintaining a stable center of gravity of wheelchair 2 at center portion 7 of chassis 4 and for focusing a locus of force of each of at least two ground drive wheels 16 at center portion 7 of chassis 4 during both seated operation and standing operation.

Figure 11A:
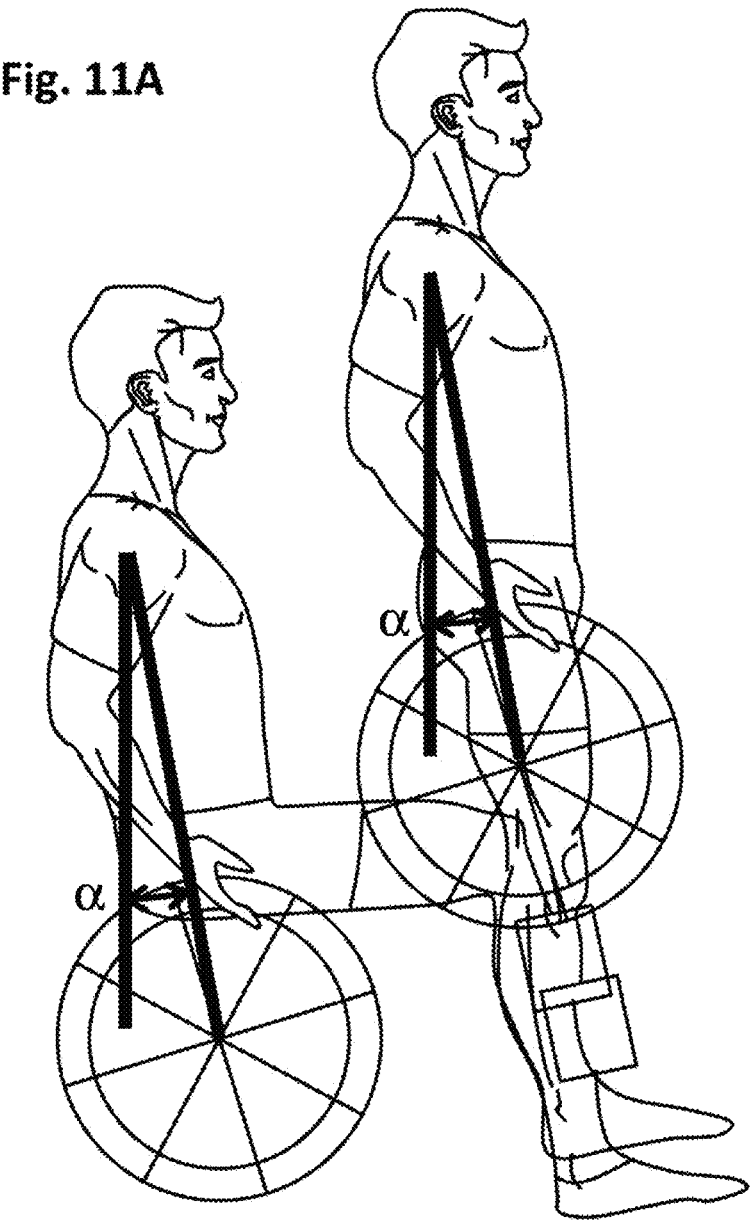
FIG. 11A-C depict a user in a seated and standing position as well as the propulsion wheel on the rotating structure of the wheelchair and angle of movement thereof, along with the small and large diameter user propulsion rims concentrically mounted thereon.
Figure 11B:
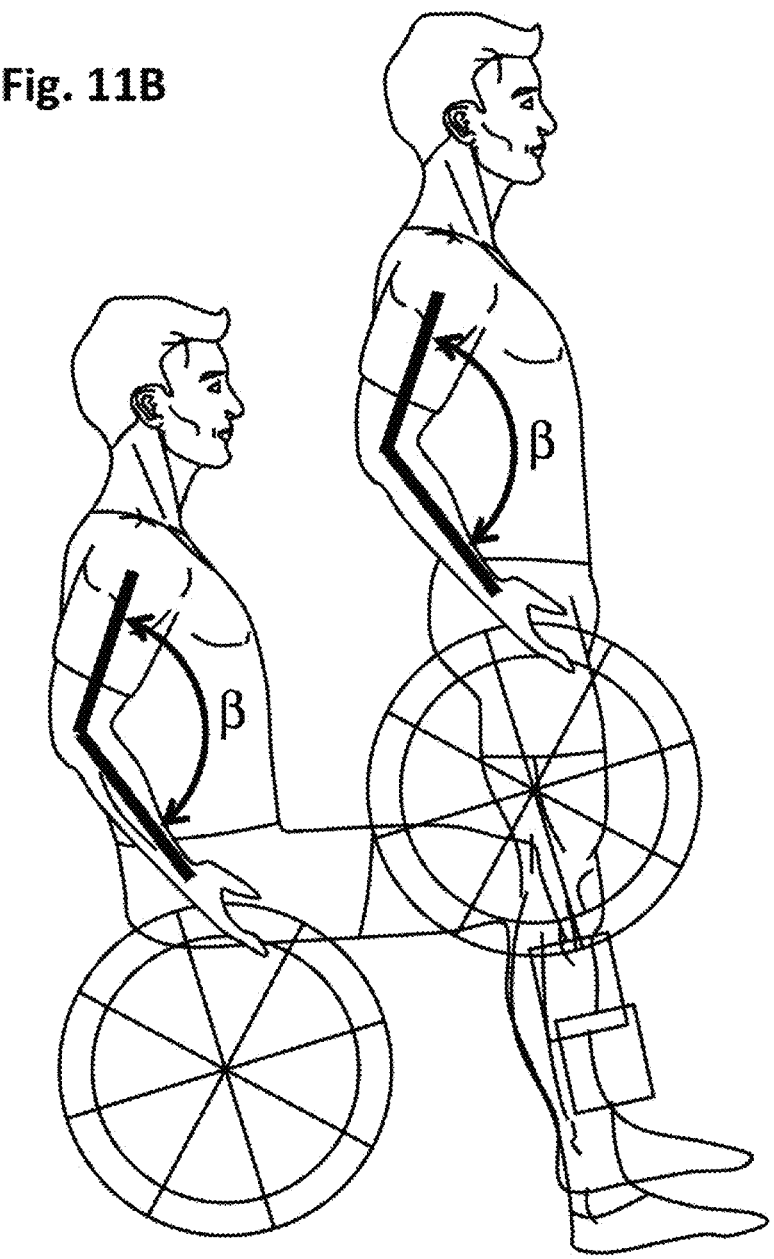
Figure 11C:
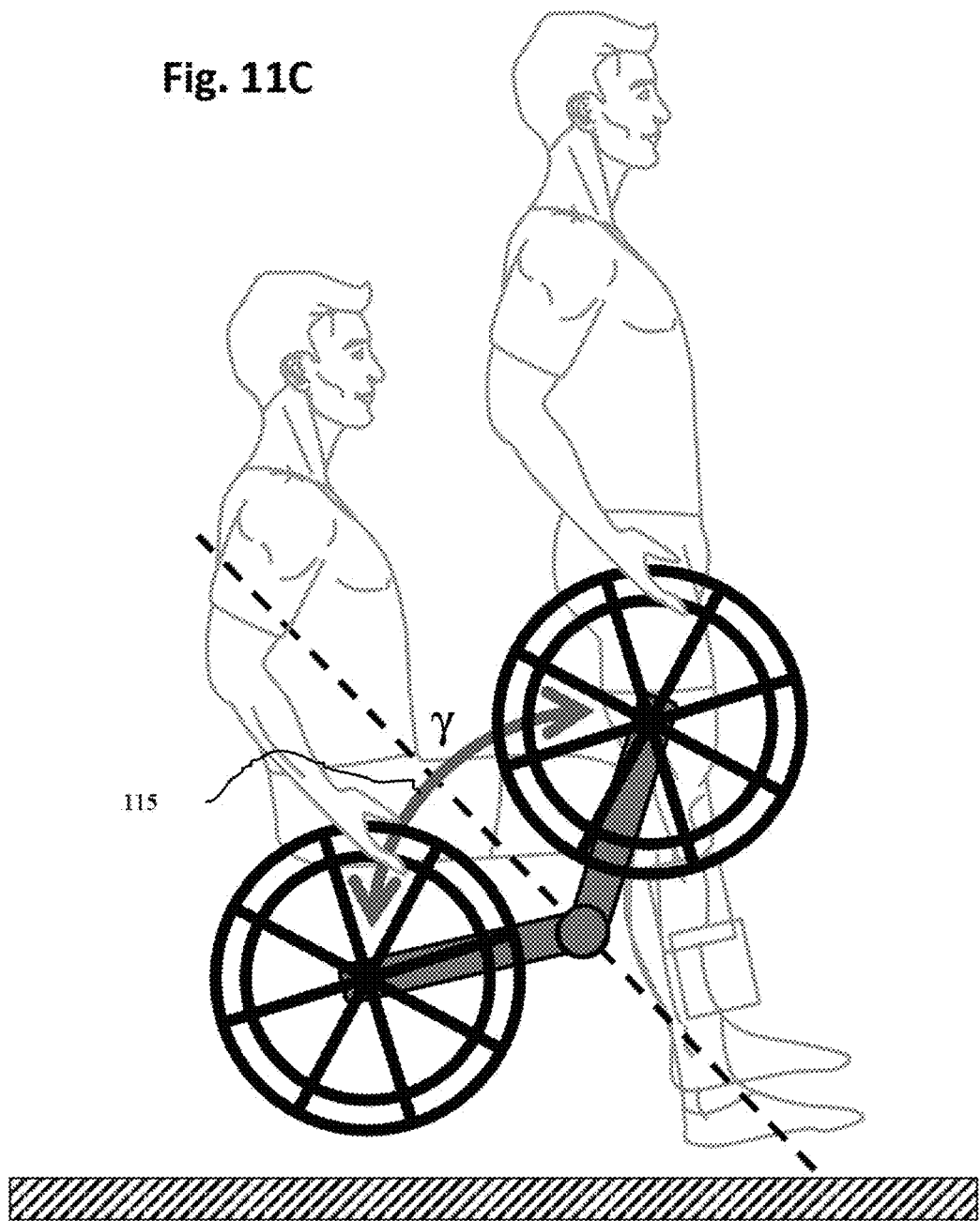

Additionally, the inventive standing wheelchair according further includes a convertible user support section 13 affixed to the chassis, such that the convertible user support section 13 can convert to a seat during seated operation, and can transition to a standing support during standing operation, and offers, at its maximum standing position extension and almost fully erect positioning that illustratively ranges from 0 to 15 degrees off of a vertical coronal plane of said wheelchair. The standing wheelchair also includes an auto tensioning linkage system that for the left links and right links 66 of wheelchair 2, includes at least one spring loaded sprocket 62 respectively, each on said left side and on said right side, wherein auto tensioning of each said at least one spring loaded sprocket respectively maintains tension on each link, such that each link has a range of functional bending up to, and including say, 180° (or, as seen in FIG. 11C at angle γ at 115 which illustratively extends up to a convenient 140° upper limit), wherein the spring loaded sprocket is affixed in such a way so as to move along a dynamic transition line. Furthermore, in one embodiment (illustrative FIG. 5B), each of the links may be operatively covered by a linkage guard 113 to protect the user from the danger of operating links and sprockets during motion of wheelchair 2, and furthermore, the chassis 4 of wheelchair 2 further includes, on each side, a protective frame portion 213 that cooperatively mates with said linkage guard 113 when said wheelchair is in standing operation, thereby providing an inset wheel placement that offers a narrower width differential when compared with other wheelchair widths. Also, one embodiment provides for rotating structure(s) 12 on either or both sides of wheelchair chassis 4 to move independent of any extension or retraction of wheelchair chassis 4, such that the user can make adjustments to the frontal clearance through a standing space adjustment offset 313. As provided, standing wheelchair 2 provides for ground drive wheels 16 to be rotatably affixed on each side, at the center portion 7 of chassis 4, such that the combined center of gravity of the user and wheelchair 2 is approximately centered at or close to center portion 7, on as to offer a resulting locus of three from user propulsion of user propulsion wheels 6, acting on ground drive wheels 16 via linkage system 50, at positions on the ground, whereby the positions receiving the resulting locus of force migrates, in one illustrative embodiment, fore and aft of the two ground drive wheels 16 such that the load distribution (e.g., the total weight of the user and wheelchair, as expressed through wheels on the ground) remains greater than 60% proportionally on ground drive wheels 16 and less than 40% together on the directional support wheels 20 and/or stabilizing rear wheels 24, which means that the actual distances between the directional support wheels 20, and/or stabilizing wheels 24 away from the ground drive wheels, along with the variance in actual user weight can affect the resulting weight distribution. To that end, with specific reference to FIGS. 3A-3C, in FIG. 3A, in one illustrative embodiment, approximately 60% or greater of the force or (drive) load distribution, is focused on load line 32a (when seated), load 32b (when transitioning between seated and standing positions), and load line 32c (when erect or in fully standing position). Such maximization of load distribution evenly across various user positions is a direct result of the innovative structure as described herein, and results in greater stability and vastly improved propulsion power transfer and traction dynamics of ground wheels 16. Lastly, other embodiments of standing wheelchair 2 further includes leaning protection, and provision of a bi-directional fixed hub system (having a bi-directional, multi-gear hub 68 and switching means, not explicitly depicted), optionally provided with brakes, that is concentrically mounted on user propulsion wheel 6, for engaging the drive wheel system at one of several predetermined gear ratios, the bi-directional fixed hub system having a user switching means for transitioning between the one of several predetermined gear ratios.

Thus, as seen in the above-mentioned figures, as well as in figures described hereafter, are each of the above components which are discussed in greater detail below. A central part of the present invention is wheelchair frame or chassis 4, and situated on the chassis is convertible user support section system 13 that allows wheelchair 2 to easily transition between seated and standing positions, as well as positions between each of those terminal positions, known herein as "a transition". As seen in FIGS. 1A-1F and in the figures described hereafter, the trunk and the lower part of the legs (shanks or lower extremities) of a user can maintain roughly the same orientation with respect to each other, as the chair transitions between the seated and standing positions.

In order to assist in any transition, or more specifically, the transition between a seated position and a standing position, and back thereto, a lift assistance mechanism or adjustment actuator 30 may be employed on the convertible user support section. Adjustment actuator 30 may take many different forms, but in one illustrative embodiment, may comprise the use of devices such as commercially available gas springs that can be readily employed to assist in the transition between the seated and standing positions, and virtually any position therebetween. In one illustrative embodiment, adjustment actuator 30 (partially depicted as a button activated system in FIG. 1A) may, in one alternative embodiment, also involve the use of rotating pulley wheels (not specifically depicted) that connect to a bracket (not specifically depicted) under the linkage bars of seat support section of convertible user support 13 through a center of each linkage bar, and which connect to the illustrative gas springs on their outer rims (not specifically depicted). Provision of such pulleys may be useful in that rotation of these pulleys can change the effective moment arm of the gas springs, thereby making them more effective for lifting the body of a user into the standing position. Typically, such pulleys will have mechanical limits allowing a range of motion of about 30 degrees. At one of these limits, the gas springs can connect to the bottom of the pulley, providing a negligible moment arm with respect to seat support section 13. As the pulley is rotated forward, the end of the gas spring will rotate backward and upward, creating a larger moment arm with respect to seat support section of convertible user support 13 and/or lower extremity support structure 14. Increasing the moment arm of the gas spring will cause the transition to the standing position. Rotation of the pulleys is accomplished through a rotation switch, which initiates rotation of the pulleys through known pulley initiators, such as movement of a lever, or from rotation of the push rims of propulsion wheel 6. In some applications, it may be preferable to provide for the use the push rims of the wheelchair for this task, but such provision will require the use of a standard clutch mechanism (not depicted) to switch power from the push rims of propulsion wheel 6 between the raise pulleys and the drive mechanism.

A significant feature of the inventive mobile manual standing wheelchair 2 is the fact that, in addition to being movable in the standing position, it can also offer the distinct advantage of permitting the user to propel wheelchair 2 manually through standard pushing of the rim of user propulsion wheel 6. This not only offers the benefit of allowing the user to propel wheelchair 2 by pushing the rims of the main wheels (e.g., user propulsion wheels 6) in a way in which they are accustomed to already, but the invention features a novel drive system 50 wherein user propulsion wheels 6 can be used to move wheelchair 2 in either seated or standing positions at approximately the same user arm reach and arm positioning. In order to provide this, FIGS. 1-5 and elsewhere depict that inventive drive system 50 provides for the user propulsion wheels 6 to be rotatably affixed to rotating member structure 12, which is in turn affixed to chassis 4, and for ground drive wheels 16 to be functionally connected to user propulsion wheel 6 through a self tensioning sprocket system 62, cooperatively engaged with independent intermediate sprocket(s) 63, as well as link(s) or belt(s) 66 (also termed links for connecting multiplicity of wheels) so that user propulsion wheel 6 can maintain the aforementioned constant user arm reach and length positioning, regardless of the particular transition or position of convertible user support section 13. To this end, the inventive drive system has a matching left side drive system and a matching right side drive system, with the left side drive system being functionally situated on the left side of chassis 4, and the right side drive system being functionally situated on the right side of chassis 4. The left side drive system and the matching right side drive system each have on their respective sides, a corresponding multiplicity of wheels comprising at least: (i) ground drive wheel 16 with concentrically mounted ground drive sprocket 67 therewith, wherein ground drive wheel 16 is rotatably affixed to chassis 4; (ii) and user propulsion wheel 6 with a concentrically mounted propulsion sprocket 68 therewith, whereby propulsion wheel 6 is rotatably affixed to rotating member 12. The left side drive system and the matching right side drive system each also have a corresponding drive linkage system 50 for operatively connecting ground drive wheel 16 with user propulsion wheel 6. In doing so, the drive system 50 on each side has at least one independent intermediate sprocket(s) 63 for providing cooperating hubs between concentrically mounted ground drive drum 67 of ground drive wheel 16 and concentrically mounted propulsion drum 68 of the user propulsion wheel 6, all of which connects, in a cooperative drive fashion, the multiplicity of wheels (e.g., ground drive wheel 16 and the user propulsion wheel 6) via at least one independent intermediate sprocket 63, the independent intermediate sprocket 63 being "independent" of concentric affixment to ground drive wheel 16 and user propulsion wheel 6, but which acts interconnectedly in concert with auto-tensioning sprocket 62 so as to provide for the directional transfer of the angular moment of power from the user pushing the rims of user propulsion wheel 6 to ground drive wheel 16, regardless of the exact location of user propulsion wheel 6 in relation to ground drive wheel 16 that may result from any given transition of convertible user support section 13.

Figure 6:
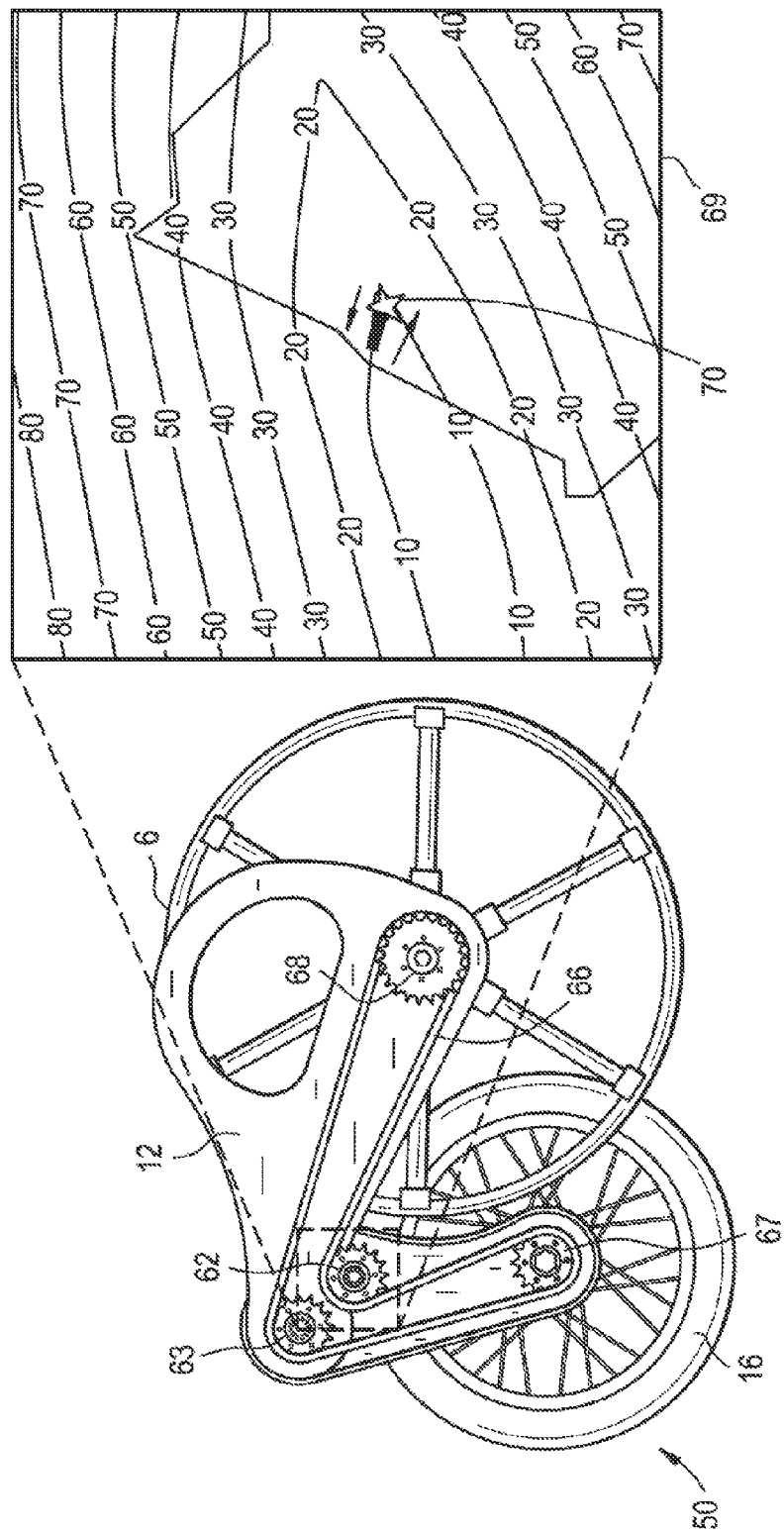
FIG. 6 is a side view showing only one-half or one side of the multiplicity of wheels and the rotating member in one embodiment, specifically depicting one embodiment of the auto-tensioning link and associated gear wheels of the standing wheelchair, and the possible degrees of angular positioning and corresponding link length related thereto.
Figure 10B:
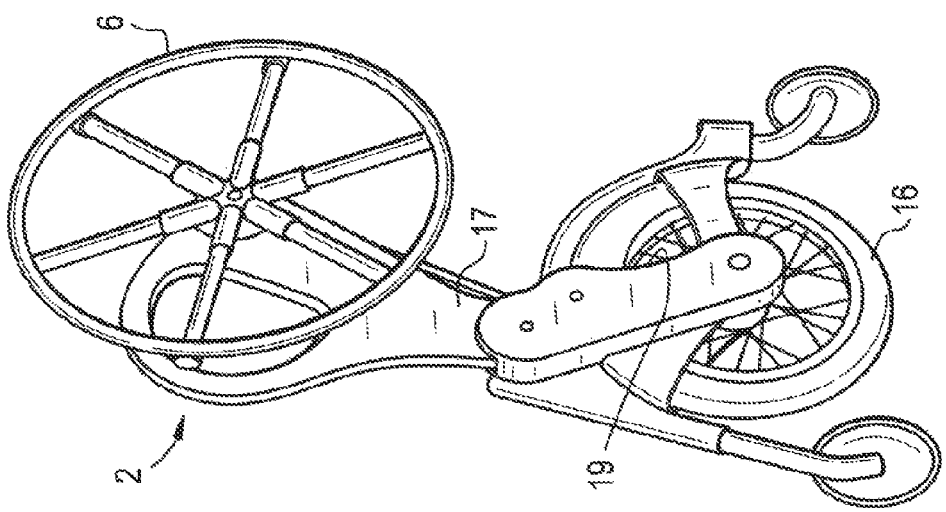
FIG. 10 depicts offset side frontal views of one embodiment of the standing wheelchair with one version of an illustrative "one belt" system having: the rear stabilizing wheel, the front (directional support) wheel, (single chain) auto-tensioned linkage, rotating member, and cooperatively mating drive wheel (with cooperating user propulsion wheel depicted therewith), across various positions, from fully retracted or seated position (with frontal wheels fully retracted, and rotating member in a fully retracted position), to fully extended or standing position (with frontal wheels fully extended, and rotating member in a fully upward position), according to one embodiment of the present invention which highlights the cooperatively mating drive wheels and rotating member-affixed user propulsion wheels that are mated so as to provide an inset that reduces the width of the wheelchair.
Figure 10A:
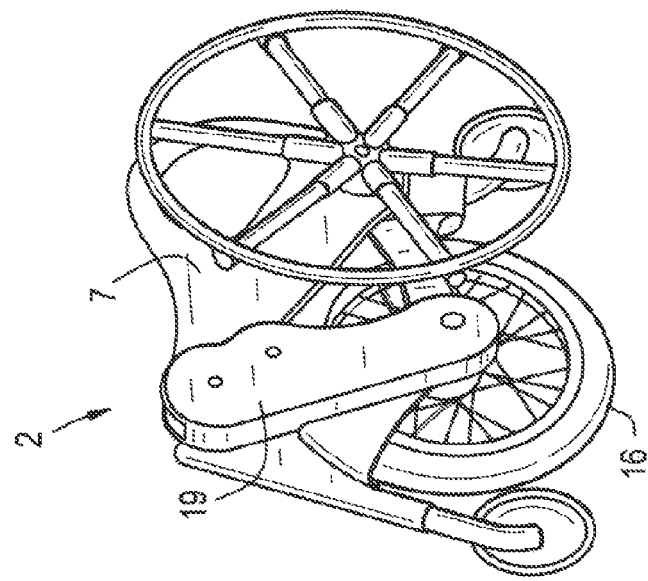

The above referenced components of the drive system are respectively connected together by chains or belts, as depicted in the above-referenced figures. In one embodiment, only one chain or belt may be utilized for drive system 50 on each respective sides of wheelchair 2, instead of multiple chains or belts in drive system 50 on each respective sides of wheelchair 2, because of the innovative auto-tensioning system described herein. Specifically, the auto-tensioning system as described here is, in one embodiment, a spring-loaded sprocket that is positioned in such a location (e.g., as depicted in FIGS. 6 and 10) that minimizes the change in length of the chain (link) as the user propulsion wheel(s) 6 (mounted on rotating member 12) rotate upward for standing operation (resulting in a displacement that is, illustratively speaking, <10 mm), while still being in a location that is physically operable overall (See e.g., the dark gray area within inset detail 69 in FIG. 6 that shows locations with sprocket and/or chain interference). Accordingly, for example, as the armrest 17 (situated on rotating member 12) rotates through its range of motion, the spring loaded idler sprocket will first move inward and then back outward to its initial location, along detail 70 in FIG. 6. When provided as such, the tension on the chain should therefore be the same in the seated and fully standing positions. The challenge of connecting user propulsion wheels 6 with the ground drive wheels 16, is therefore the change in distance between their respective axles (transition) 69 as the wheelchair transitions from the seated to the standing positions, as depicted in, for example, FIG. 6. This change in distance, may in one embodiment, be accordingly managed with appropriately positioned auto tensioning sprocket 62 and by using a moving "flexing" type drive system with cooperating sprockets 67, 63, 68 as depicted in FIG. 6, capable of bending up to and including 180°. In such a case, the flexing drive system will be a generally dog-legged, pivoting bracket that is affixed to the structure of wheelchair 2 and will generally not protrude in a posterior direction from the chair, thereby providing the advantage of reduced structural interference when the user maneuvers around neighboring objects in his environment. Therefore, in order to effectuate the above, the spring loaded sprocket is affixed in such a way so as to move along the possible dynamic transition lines seen within inset diagram 69 in FIG. 6.

Provision of all of the above ensures that drive system 50 is configured so that user propulsion wheel 6 is maintained in a position so as to be a relatively constant access position to a user, thereby avoiding any real change in the distance between the shoulders of the user and the rims and/or axle of user propulsion wheel 6. This is deemed important in actual use, as changing the distance between the shoulders of the user and the rims or axle of user propulsion wheel 6 is undesirable because the user's shoulders and arm positions (Seen in FIGS. 11A and B, as referenced by angles α and β, where angle α indicates the desired forward position of the axle of the user propulsion wheel 6 as angularly measured off a true vertical vector, and where β indicates the approximate angular positioning of user arms for providing hand contact at top dead center of the propulsion wheel 6, wherein the resulting arm/hand positioning offers the most ergodynamic, stress reduced structural accessibility) are largely important for wheelchair ambulation, and accordingly, changing this distance may reduce the effectiveness of the user's shoulders and arms in applying appropriate forces to the push rim for propulsion and braking purposes. Further to this point, the user propulsion wheel is therefore, as discussed above, affixed to user propulsion wheel support structure 12, which is rotatable about angle 115, so that the torso of a user is closely aligned with user propulsion wheel 6 whether in seated or standing positions (or therebetween), thereby ensuring that the hands are angled or situated (whether seated or standing) so as to contact the user propulsion wheel 6 more consistently in all positions, as also seen in FIGS. 1A-1F. Thus, each given user propulsion wheel 6 (and the rims associated therewith) are maintained in a position so as to be a relatively constant access position for the user to push or propel user propulsion wheel 6. More specifically then, FIG. 11C illustratively depicts a user in a seated and standing position, as well as the respective positions of user propulsion wheel 6 on the rotating structure of the wheelchair 2. To this end, a rotation axis point can be chosen from any point along the dashed line in FIG. 11C to provide a biomechanically optimal positioning of the shoulders for both seated and standing propulsion, which should minimize muscle stress, co-contraction, and metabolic cost, as shown illustratively for one point that exists in a convenient location for mounting to the wheelchair. It is noted that the resulting user positioning of hands as afforded by the innovative design herein is therefore much more than mere design alternative, in fact, known standing wheelchairs cannot offer this constant hand positioning about user propulsion wheel 6, and accordingly, users of known approaches will have much greater variance in hand positioning across seated and standing positions, the biomechanics of which dictate that, without the novel constant access, will leave users fatigued much more quickly during periods of vigorous usage.

Figure 7:
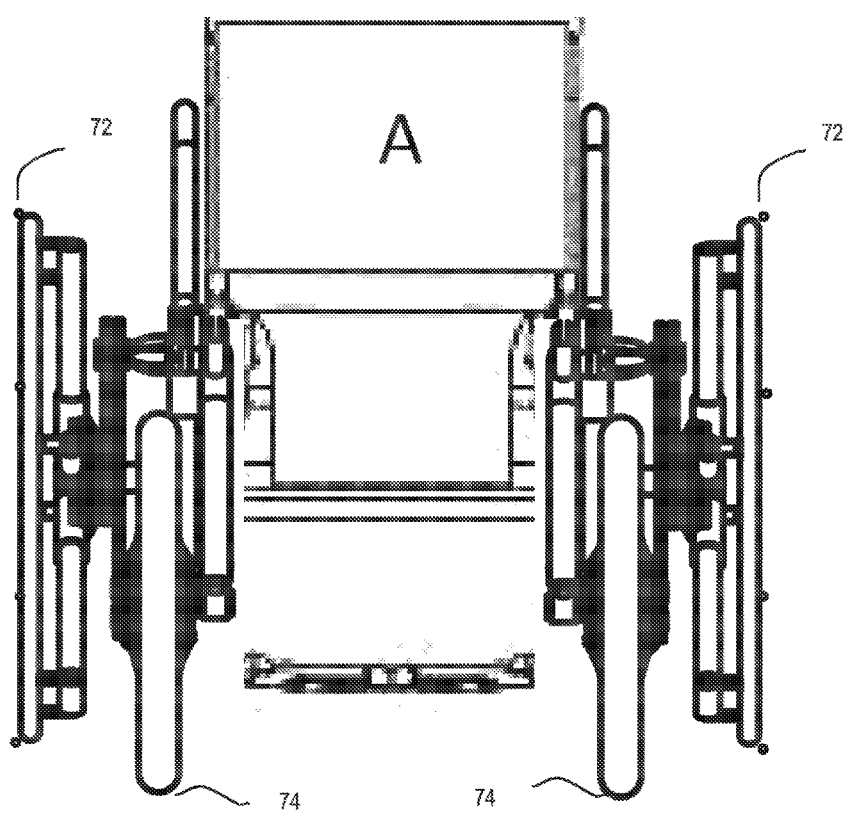
FIG. 7 is a frontal view of an illustrative wheelchair according to the invention, having a two chain embodiment, indicating the overall width profile and the protruding user propulsion wheels.
Figure 8:
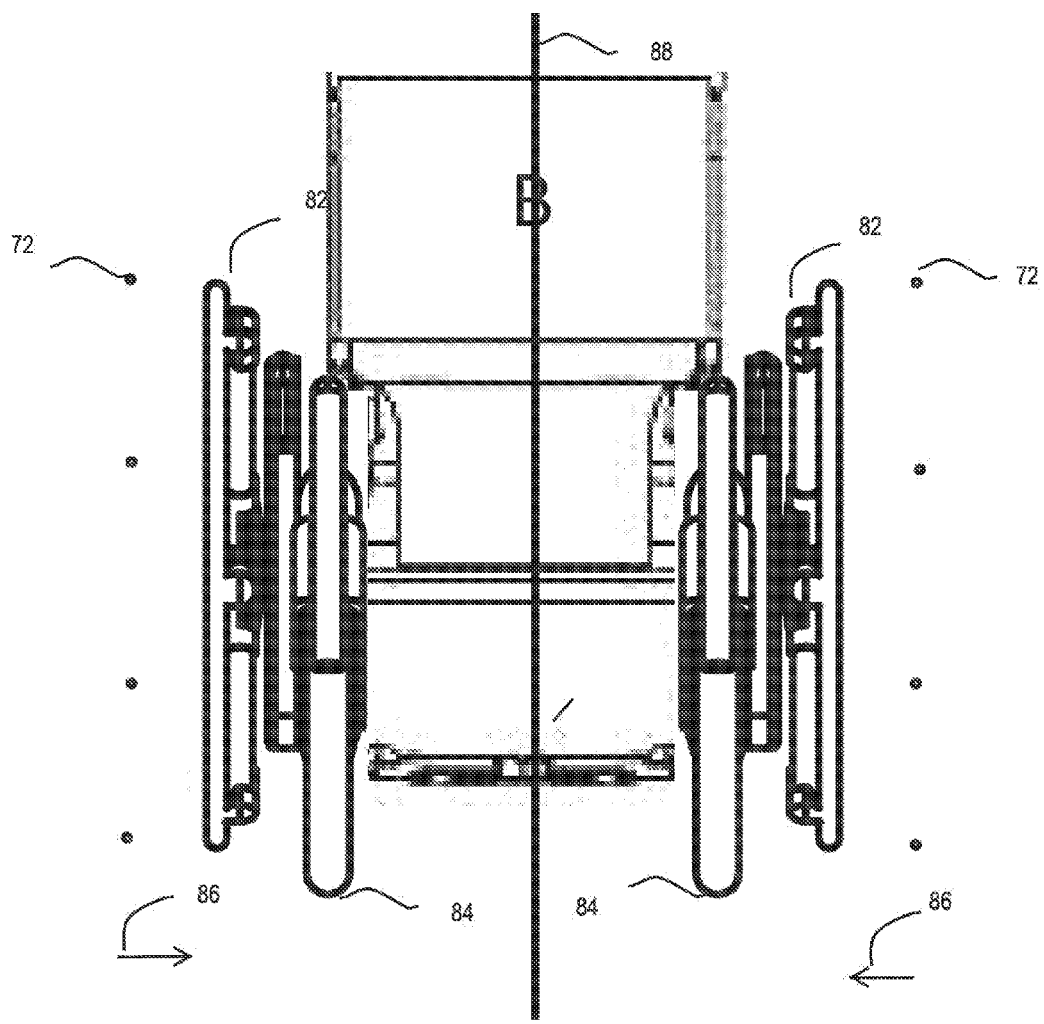
FIG. 8 is a frontal view of an illustrative wheelchair according to the present invention having a single chain embodiment, indicating the overall width profile and the inset user propulsion wheels as compared to protruding user propulsion wheel width found in FIG. 7.

Additionally, the present invention provides for cooperatively mating ground drive wheels 16 and user propulsion wheels 6 so as to provide an inset that reduces the width of the wheelchair as seen in FIG. 8, when compared with width profiles found in wheelchair, such as FIG. 7. Thus, the present invention provides for a novel "medially inset" wheel coupling on the left and right portions of chassis 4, whereby each respective ground drive wheel 16 and user propulsion wheel 6 are cooperatively coupled, and each respective user propulsion wheel 6 is inset when compared to approaches such as that seen in FIG. 7. As seen in FIG. 8, each respective user propulsion wheel 6 is inset along a medial line across chassis 4, such that each respective user propulsion wheel 82 is ultimately situated, at each respective left portion and right portion of chassis 4, closer to a medial center 88 of standing wheelchair 2 when compared with user propulsion wheel positioning 72 of other designs. This novel feature, also termed inset or inset differential 86 is more than a simple design prerogative, indeed, it is a key feature that affords the resulting width, as measured from left portion to right portion of chassis 4, to be narrowed as compared with other designs, thereby affording a user the ability to traverse various sizes of home and commercial doors and portals, especially legacy door frames which tend to be of such non-standard, narrow widths, that some wheelchairs simply cannot traverse the same, due to overall width dimensions. It is noted that this feature is not simply predicated on a narrowing of the thickness (width) of each respective user propulsion wheel 6, but owes its resulting narrow profile to the mated protective frame seen in FIGS. 8 and 10, which permits the same to be narrowed without exposing the user to hand injuries during use, and also affords a compaction of space through the cooperated mating of the bottom 19 and upper 17 frame parts. As illustratively seen in FIGS. 8 and 10,) ground drive wheels 16 can be cooperatively positioned within the frame of the wheelchair, with fenders to protect the user. The frame of chassis 4 may therefore optionally also incorporate a housing at 19 to cover the chains of linkage drive system 50, thereby protecting the wheelchair user from the moving chain and sprockets.

Figure 12A:
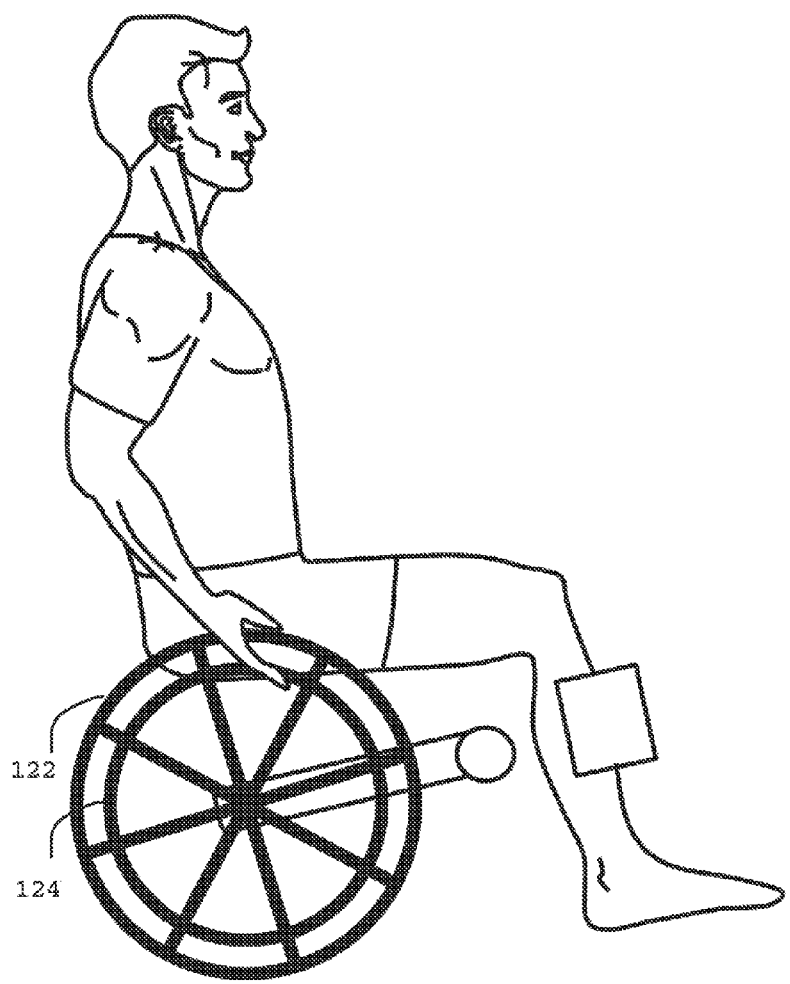
FIG. 12A-12B depicts, respectively, a seated user with the inventive propulsion wheel mounted on a rotating structure at the biomechanically optimal position for the shoulders (12A), and the inventive propulsion wheel rotated downward and lower than seat (seated user) level (12B).
Figure 12B:
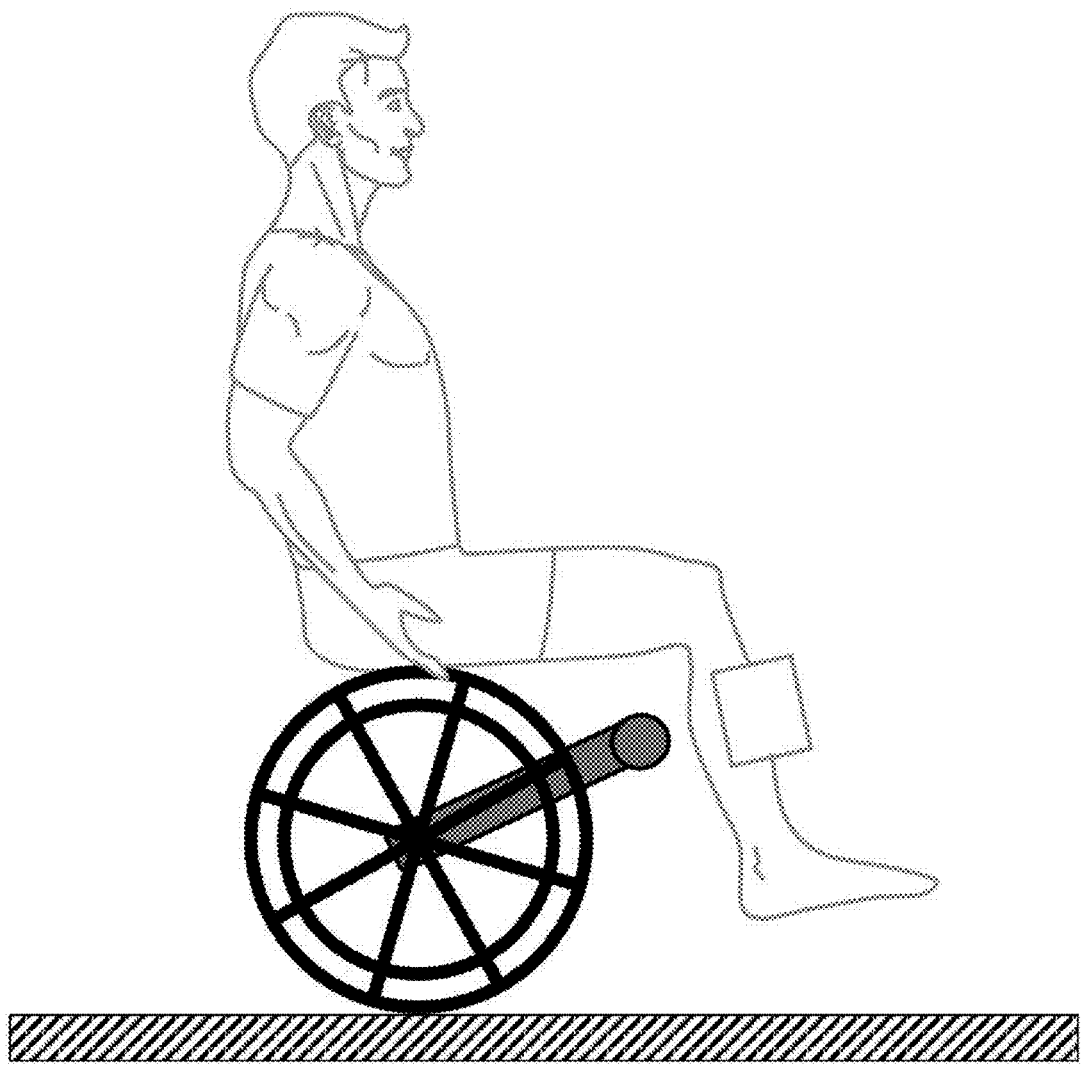

Accordingly, user propulsion wheel 6 (as seen in FIGS. 12A-B and in the instant FIGS. 8 and 10) may also be inset medially and any chains of linkage drive system 50 are situated within novel hollow arm rest 17 (also referred to herein as rotating member 12) that can independently pivot upwards (forwards) and downwards (backwards) during standing and seated operations, providing access to the push rims of user propulsion wheel 6 for mobility. Such structural features can reduce the width of an illustrative wheelchair from say, 31 inches to 26 inches (for an illustrative 18 inch seat width), thereby allowing the user to go through most doorways in homes and businesses. Note that, as seen in FIGS. 12A and 12B, user propulsion wheels 6 may each include at least two user propulsion rims 122, 124, one user propulsion rim having a small diameter (124) and the other having a large diameter (122), concentrically mounted on each respective said user propulsion wheel, along the same axis as said propulsion wheels, for providing both forward and reverse propulsion when said user propulsion wheel is pushed in either a forward or backwards direction, and for changing gearing without the need for a user operated gear switch for switching between forward and reverse propulsion. Further note that the respective diameters of small diameter user propulsion rim 122 and large diameter user propulsion rim are not expected to have ideal diameters, but rather have diameters of such size as they can complement the given size of user propulsion wheel 6 by providing, respectively for propulsion according to diameter ratios that allow for "fast" propulsion (e.g., small diameter user propulsion rim 122) and "slow" propulsion (e.g., large diameter user propulsion rim 124). Thus, the designations "large" and "small" diameter (and similarly, "slow" and "fast") are not intended to be inexact terminologies, but rather are intended to be understood within the context of both the chosen diameter of user propulsion wheels 6 and the understood mechanics of gear/diameter ratios thereon in designing optimal speeds and the like.

With additional reference to FIG. 12A-12B which depict, respectively, a seated user with the inventive propulsion wheel mounted on a rotating structure at the biomechanically optimal position for the shoulders, and the inventive propulsion wheel rotated downward and lower than seat (seated user) level, it is further noted that the novel ability to rotate the user propulsion wheel 6 completely downward to the ground independently of the seat, via rotating member 12, is extremely important because it allows for direct lateral transfers into and out of the wheelchair. Essentially, this means that, as best depicted in FIG. 12B, that when a user needs to exit standing wheelchair 2 from the side (for example, when being transitioned into an adjacent bed), that the user need not lift his rear end "up and over" what would be a blocking wheel (e.g., user propulsion wheel 6), because it can be rotated completely downward so as not to block the user exit. In addition to this novel feature of providing a range of motion downward to the ground being unknown in the art, it is a significant technical advance, rather than mere design variance—not just because some paralyzed users cannot lift their back ends "up and over"—but also because many wheelchair user suffer from dangerous pressure ulcers on their rear ends, such that dragging that portion of the user's body over protruding wheelchair wheels during side exit-type transitions can further damage or reopen these pressure wounds with potentially deadly consequences for some users.

Depending on whether the user is traversing an incline, decline, or an unconventional surface, inventive standing wheelchair 2 provides for a gearing system that allows the user to change the gain between the push rims and drive wheels in order to help offset for factors such as incline, added weight, or terrain. Although such gearing could relate to a derailleur system similar to those used on many bicycles, such bicycle gearing mechanisms are designed to transfer torque in one direction only, for example, systems with hubs that "free-wheel" when driven in the reverse direction. It is noted that this behavior is not necessarily optimal for a wheelchair because the push rims typically control the wheels in forward and reverse directions, and a "free wheel" system would eliminate the possibility of backwards movement. Other types of bicycle hubs, such as true "fixed-gear" hubs provide a more direct connection between the bicycle crank and the drive wheel (thereby removing "free-wheel" or "coasting" behaviors), and remove the need for brakes on bicycles, given that the drive wheel can be decelerated by using the lower limbs to resist movement of the crank or propulsion means. A bi-directional fixed hub system is provided for in the present invention, which permits the user to push the rims of user propulsion wheel 6 in either a forward or backwards direction in order to achieve respectively, a forwards or backwards propulsion in one of several gear ratios. This hub, can be concentrically mounted (not specifically depicted) on the axle of at least one user propulsion wheel 6 for engaging the drive wheel, system at one of several predetermined gear ratios. The bi-directional fixed hub system may further have a user switching means, such as a small lever (not depicted) for transitioning between said one of several predetermined gear ratios. Such a system may be selected from the recent advances in bi-directional fixed hub, three-gear systems for bicycles, such as those available from Sturmey-Archer of Napa, Calif., sold under the name S3X™. Such a hub is, in one embodiment, an internal gear hub, meaning the gearing is internal and protected from many environmental elements. In one embodiment, two bi-directional multiple (3-speed) fixed-gear internal hubs are provided, one on each side, concentrically mounted on the user propulsion wheel, and will have sprocket sizes that provide an appropriate gearing for say slow, normal, and fast (backwards and forwards) propulsion of wheelchair 2 in seated and/or standing positions, both hubs being further simultaneously controlled by one switching means in an illustrative embodiment. In implementing this system in the context of the present invention, it is noted that for the standing position, one embodiment may include the option for blocking the fast propulsion speed for safety reasons. In either case, the aforementioned approach should allow the user to move forward, backward, to the side (turning), and to stop, using the push rims of user propulsion wheel 6 in the same manner as a standard wheelchair. Separately, it is further noted that provision may also be made for brakes on the wheelchair which involves levers attached to the frame that push into one or more of the multiplicity of wheels.

As such, in one embodiment, connection may be made for brakes on the rotating member that will interact with the push rims of user propulsion wheel 6, or alternatively provision maybe made for incorporating the brakes within the transition system as known in the art of bicycle braking or alternatively, might have braking mechanisms built-in that could be remotely activated.

In an optional embodiment of the present invention, as soon as a transition is made from a seated position to an elevated position, front directional wheels 20 may descend to afford stability and balance from tipping over. Advantageously, front directional wheels 20 also can, in one embodiment, be retracted by extension using a mechanical linkage system (not specifically depicted) so as to limit the catching or digging in of frontal wheels of wheelchair 2 on extreme inclines, curbs, or very rough terrain, without which, would pose a danger for an occupant who might be injured were the wheelchair to flip over in a forward direction. Thus, the front directional wheels 20 act as frontal anti-tip wheels when standing (e.g., comes down into contact with the ground while transitioning from seated to standing positions and that act as front wheels during standing operation), but the retraction of the same when in seated operation allows the wheelchair to go over a curb cut or other low obstacle without hindrance or danger to the user. Similarly, rear wheels 24 remain on the ground during seated operation, although they also remain near the ground during standing operation, when they act as anti-tip wheels. Although rear wheels 24 do not retract like front directional wheels 20, they nevertheless act as functional casters, but not anti-tip wheels when in seated position, and they will the extend base of support when in standing position.

Figure 4B:
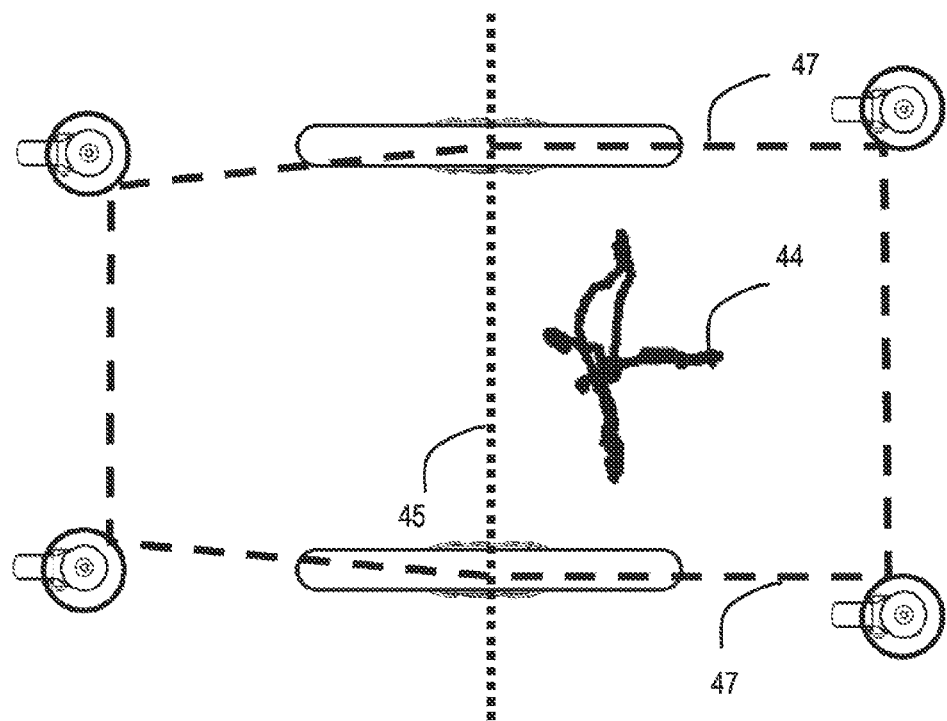

In any case, when standing wheelchair 2 transitions to the erect, standing position it will accordingly raise up the overall center of gravity of wheelchair 2. However, standing wheelchair 2 already features a relatively low center of gravity, but when combined with front and back wheels, it is nevertheless possible to move or propel wheelchair 2 in the standing position in an improved fashion on slightly inclined and/or rough surfaces. By way of yet another embodiment, it is noted that as depicted in FIGS. 3A-3C and FIGS. 4A-4B, that the present invention can be modified such that the center of gravity and the locus of the ground drive force is expressed proximate to ground drive wheels 16 towards either the immediate back (See, e.g. FIG. 4A) of ground drive wheels 16 (rather than posterior or rear portion of the frame of chassis 4 of wheel chair 2), or the immediate front (See, e.g. FIG. 4B) of ground drive wheels 16 (rather than front portion of the frame of chassis 4 of wheel chair 2). When provisioned as such, the center of gravity (illustratively depicted in FIGS. 3A, 3B, and 3C as load force vectors 30*a*, 30*b*, and 30*c*, respectively), and therefore, the locus of the drive force is effectuated near the center of wheelchair 2 (alternatively expressed through chassis 4, including coupled appurtenances described herein), close to the front or back of ground drive wheels 16, instead of say, the rear or frontal part of a wheelchair chassis, and are expressed comparatively lesser at non-ground drive wheels (e.g., collectively at less than 40% in one illustrative embodiment) at vectors 31*a*/31*b*/31*c*, which is in contrast to where it was previously found to be the case with some prior art wheelchairs that balance of weight as expressed through the chassis and the like to the ground, and the resulting forces expressed thereon, resulted in an undesirable drive force dissipation, and spin outs. To maintain traction on rear drive wheels in some other versions, the user must limit how far into full vertical position they stand, in order to allow for adequate traction by maintaining relative weight on the back drive wheels, however, at least one illustrative embodiment of the present invention overcomes this frustrating inefficiency, and permits improved vertical positioning, while maintaining maximized drive force effectuation to the ground surface that ground drive wheels 16 contact during use. To this end, FIG. 4A and FIG. 4B are illustrative of this novel type of force distribution, as evidenced by the trail of time elapsed data points of force distribution 43, 44, relative to wheelchair middle axis 45. Although illustrative in nature, these time elapsed data points emanated from exemplary quantitative testing of the stability of the inventive mobile manual standing wheelchair 2, wherein measurements were taken of the centers of pressure, over time, of the net ground reaction force under the wheelchair for the following conditions: sitting upright, leaning to the right and left, and leaning forward (trail of data points in FIG. 4A); and standing upright, leaning to the right and left, and leaning forward (trail of data points in FIG. 4B). In general, it was found that the proximity of the net ground force (data points of force distribution referenced above) 43, 44 to the wheelchair middle axis 45 did not typically deviate about the drive wheels by a distance large enough to yield, illustratively, less than 60% load distribution (total weight of user and wheelchair) to be expressed on ground drive wheels 16, thereby allowing significant weight to be distributed on ground drive wheels 16 in both seated and standing postures. Thus, given the proximity of the locus of ground force indicated at 43, 44 (see also load force vectors 30a, 30b, 30c as respectively indicated in FIGS. 3A-3C, for side depictions thereof), across various positions of use, to the wheelchair middle axis 45, this novel positioning of the aforementioned components offers distinctly superior stability and drive traction performance.

Figure 5A:
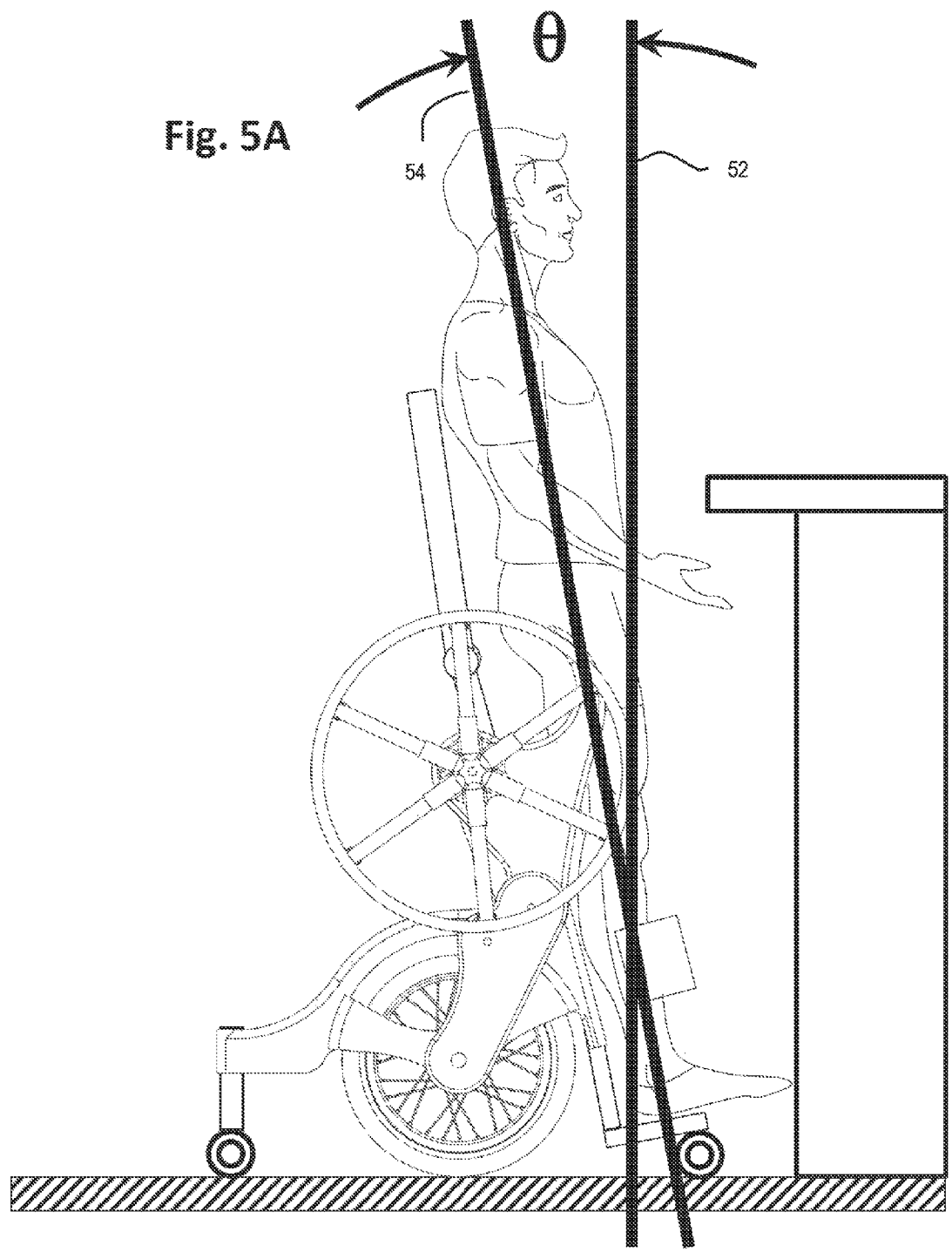
FIG. 5A is a side view showing only one-half or one side of the multiplicity of wheels and associated support structure of one embodiment of the standing wheelchair when fully extended in the standing position against an illustrative counter or protrusion according to the present invention, wherein a line of recline is measured by angle Θ against a true vertical line of reference is illustrated.
Figure 5B:
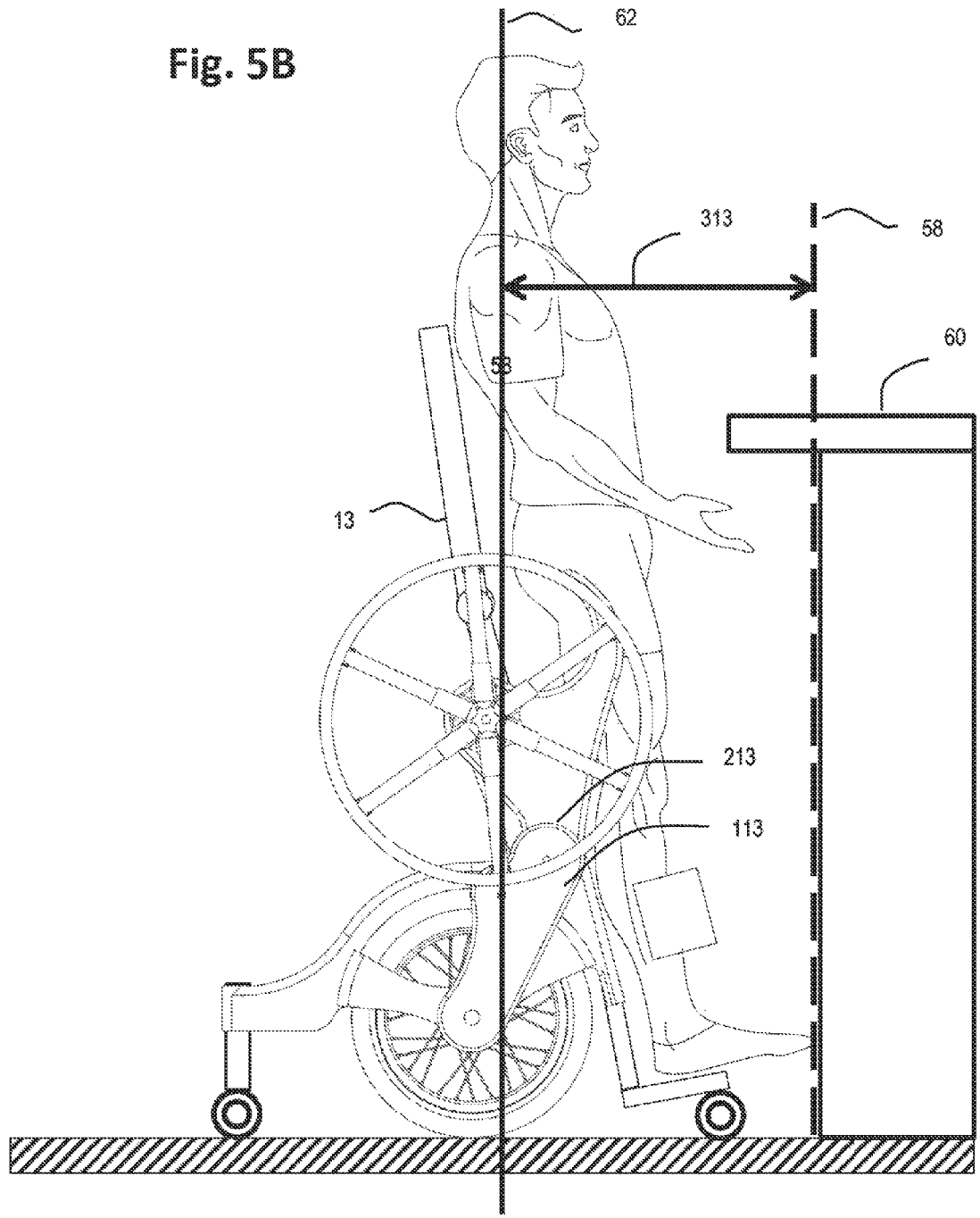
FIG. 5B is a side view showing only one-half or one side of the multiplicity of wheels and associated support structure of one embodiment of the standing wheelchair when fully extended in the standing position against an illustrative counter or protrusion according to the present invention, wherein a line of anterior clearance space x is measured as a standing space adjustment offset against a line of reference for an elevated surface or vertical barrier is illustrated.

Of note is the novel provision of affixing the two user propulsion wheels 6 so as to rotate with the (independently rotating) rotating member(s) 12, rather than having user propulsion wheels 6 rotate concomitantly (automatically) with a seat or user support member 13 during raising and lowering between standing and seated operation positions. When this provided in combination with something termed a standing space adjustment offset x as seen in FIG. 5B, additional novelty is afforded. Essentially, the standing space adjustment offset allows a user, when in standing operation, to push the left rotating structure and the right rotating structure out of the way (useful in situations when, for example, a user is situated at a counter 60 or other elevated surface) the anterior clearance space (measured from say, 58 to 62 as illustrated) in front of wheelchair 2 is duly increased by the use of such novel adjustable means. Also, as seen in FIG. 5A, user is afforded the ability to be able to reach a true (or as close of a true) vertical standing position, as measured at an angle $\Theta$, seen at 54, from vertical line 52, meaning that the maximum standing position extension in one illustrative embodiment might range from 0 to 15 degrees off of a vertical coronal plane of said wheelchair, which when combined with the ability to afford the anterior clearance space as result of the range of movement of supporting member 12 along angle 115 (as see in FIG. 11C), provides truly innovative frontal space and vertical alignment that allows a user to reach or access counter 60 or other elevated surface readily.

Lastly, the novel features that offer improved width reduction in chassis 4, that enable a user to transit between narrower door frames (such as those that may tend to be found, for example, in older homes) necessarily reduces the width of wheelchair 2, it is also necessary to reduce the width of the drive wheels. This reduction in drive wheel width inherently reduces the wheelchair base of support, however, the wheelchair 2 base of support can become narrower while still providing a stable base (leaning protection) because of the large distance existing between the center of force during lateral leaning 43 and 44 and the wheelchair base of support (dashed lines in FIGS. 4A and 4B), indicated, respectively, by seated base of support, the limit of which is generally depicted along line 42 in FIG. 4A, and standing base of support, the limit of which is generally depicted along line 47 in FIG. 4B which shows the range of support between the drive wheel and the respective rear or back wheels, (depending respectively of course, on whether standing or seated). Thus, the novel design still allows significant changes in user balance (as indicated by illustrative time lapse depictions of centers of gravity 43, 44), such as that incurred by leaning in different front/back, left/right, etc. directions, without tipping wheelchair 2, and also provides for a tighter turning radius and improved overall portability.

The invention being thus described, it will be evident that the same may be varied in many ways. Such variations are not to be regarded as a departure from the spirit and scope of the invention and all such modifications are intended to be included within the scope of the claims.

What is claimed is:

1. A manually propelled standing wheelchair comprising:
 a chassis having a front portion, a rear portion, a center portion, a left portion, a right portion, a top portion, and a bottom portion;
 at least two ground drive wheels, one of said two ground drive wheels being disposed on said left portion of said chassis, and one of said two ground drive wheels being disposed on said right portion of said chassis;
 a rotating structure, comprising a left rotating structure and a right rotating structure, wherein each of said left rotating structure and said right rotating structure is attached, respectively, to said left portion and said right portion of said chassis;
 an adjustment actuator for raising and lowering at least a portion of said chassis between a seated position and a standing position and any intermediate positions therebetween;
 at least two user propulsion wheels, each laterally outset relative to said chassis and affixed proximate to said rotating structure, one of said at least two user propulsion wheels being rotatably affixed to said left rotating structure, and one of said at least two user propulsion wheels being rotatably affixed to said right rotating structure;
 a linkage system connecting one of said at least two user propulsion wheels with one of said two ground drive wheels at said left portion of said chassis, and another linkage system connecting one of said at least two user propulsion wheels with one of said two ground drive wheels at said right portion of said chassis;
 directional support wheels rotatably affixed to a foot rest which is affixed to a frontal extension disposed at said front portion of said chassis, wherein said directional support wheels include a caster structure for affixment of said directional support wheels to said foot rest, and said frontal extension retracts said foot rest and said directional support wheels off the ground during seated operation, and lowers said foot rest and said direction support wheels to contact the ground during standing operation;
 a set of stabilizing rear wheels situated structurally opposite said directional support wheels; and
 wherein each said at least two ground drive wheels is rotatably affixed to said center portion of said chassis, respectively, adjacent said left portion and said right portion between said directional support wheels and said stabilizing rear wheels, as a means for maintaining a stable center of gravity of said wheelchair at said center portion of said chassis and for focusing a locus of force at each said ground drive wheels at said center portion of said chassis during both seated operation and standing operation.

2. The standing wheelchair according to claim 1, further including a convertible user support section affixed to said chassis, said convertible user support section converting to a seat during seated operation, and transitioning to a standing support during standing operation, said convertible user support section extendable from a seated position to a standing position that, at its maximum standing position extension, ranges from 0 degrees to 15 degrees off of a vertical coronal plane of said wheelchair.

3. The standing wheelchair according to claim 2, wherein said linkage system is an auto tensioning linkage system and comprises at least one left link on said left side of said chassis, and at least one right link on said right side of said chassis, said auto tensioning linkage system includes at least one spring loaded sprocket respectively, each on said left side and on said fight side, wherein auto tensioning of each said at least one spring loaded sprocket respectively maintains tension on said left link and right link, such that each said left link and right link has a range of functional bending from 0° up to, and including 180°.

4. The standing wheelchair according to claim 3, wherein said at least one left link and said at least one right link are each operatively covered by a linkage guard on said left portion and said right portion, respectively.

5. The standing wheelchair according to claim 4, wherein said chassis further includes, on said left portion, and said right portion, a mated protective frame portion that cooperatively mates up with said linkage guard when said wheelchair is in standing operation.

6. The standing wheelchair according to claim 5, wherein said at least two user propulsion wheels follow said left rotating structure and said right rotating structure, independent of convertible user support section, when transitioning between seated operation and standing operation, said left rotating structure and said right rotating structure maintaining alignment of user shoulders and positioning of user arms when said standing wheelchair is in either a seated operation or a standing operation, and when in standing operation, said left rotating structure and said right rotating structure being adjustable by a standing space adjustment offset.

7. The standing wheelchair according to claim 6, wherein each of said at least two ground drive wheels is rotatably affixed such that said locus of force migrates only fore and aft, during a transition between seated operation and standing operation, a distance such that a load distribution on said at least two ground drive wheels is at least 60% of said load distribution.

8. The standing wheelchair according to claim 7, wherein each of said at least two ground drive wheels is laterally and medially inset relative to said chassis.

9. The standing wheelchair according to claim 8, wherein said user propulsion wheels each include at least two user propulsion rims, one user propulsion rim having a small diameter and the other having a large diameter, concentrically mounted on each respective said user propulsion wheel, along a same axis as said propulsion wheels, for providing both forward and reverse propulsion when said user propulsion wheel is pushed in either a forward or backwards direction, and for changing gearing without a user operated gear switch for switching between forward and reverse propulsion.

10. The standing wheelchair according to claim 9, wherein each of said user propulsion wheels can rotate downward and lower than said seat such that a user can perform a side exit-type transition.

* * * * *